US008326107B2

(12) United States Patent
Cooke et al.

(10) Patent No.: US 8,326,107 B2
(45) Date of Patent: Dec. 4, 2012

(54) REAR-SLIDABLE EXTENSION IN A FIBER OPTIC EQUIPMENT TRAY

(75) Inventors: Terry L. Cooke, Hickory, NC (US);
Tory A. Klavuhn, Newton, NC (US);
David L. Dean, Jr., Hickory, NC (US);
Juan Garcia, Tamaulipas (MX);
Manuel Lopez, Tamaulipas (MX); Juan Miguel Gonzalez, Rio Bravo (MX)

(73) Assignee: Corning Cable Systems LLC, Hickory, NC (US)

( * ) Notice: Subject to any disclaimer, the term of this patent is extended or adjusted under 35 U.S.C. 154(b) by 546 days.

(21) Appl. No.: 12/394,483

(22) Filed: Feb. 27, 2009

(65) Prior Publication Data

US 2010/0054684 A1 Mar. 4, 2010

Related U.S. Application Data

(60) Provisional application No. 61/190,538, filed on Aug. 29, 2008, provisional application No. 61/197,068, filed on Oct. 23, 2008.

(51) Int. Cl.
*G02B 6/00* (2006.01)
*G02B 6/46* (2006.01)

(52) U.S. Cl. ........................................................ 385/135
(58) Field of Classification Search ..................... 385/135
See application file for complete search history.

(56) References Cited

U.S. PATENT DOCUMENTS

| 5,129,030 A | 7/1992 | Petrunia ........................ 385/135 |
| 5,701,380 A * | 12/1997 | Larson et al. ................. 385/134 |
| 6,944,389 B2 * | 9/2005 | Giraud et al. ................. 385/135 |
| 2005/0201073 A1 | 9/2005 | Pincu et al. ................... 361/797 |
| 2006/0018622 A1 * | 1/2006 | Caveney et al. .............. 385/135 |
| 2008/0106871 A1 | 5/2008 | James ........................... 361/727 |

FOREIGN PATENT DOCUMENTS

| JP | 2005-148327 | 6/2005 |
| JP | 2005148327 A * | 6/2005 |
| WO | WO 95/20175 A1 | 7/1995 |
| WO | WO 9520175 A1 * | 7/1995 |

OTHER PUBLICATIONS

Siemon Corporation, Fiber Connect Panel (FCP3), Dec. 11, 2007, 4 pages.
European Patent Office, European Search Report for European Patent Application No. EP09010610, Apr. 26, 2010, 3 pages.
European Patent Office, European Search Report for European Application No. EP09010610, Jan. 22, 2010, 2 pages.

* cited by examiner

*Primary Examiner* — Michelle R Connelly
(74) *Attorney, Agent, or Firm* — John H. Vynalek

(57) ABSTRACT

A fiber optic apparatus having a fiber optic equipment tray and an extension adapted to receive, organize and manage fiber optic cables routed to the fiber optic equipment tray is disclosed. The fiber optic equipment tray has a front, a rear, a base, and at least one extension rail. The extension movably attaches to the fiber optic equipment tray at the extension rail and, thereby, slidably extends from and retracts toward the rear of the fiber optic equipment tray. The extension comprises a shelf and a cable management tray hingedly attached to the shelf. The shelf moves over the base when the extension extends from and retracts toward the fiber optic equipment tray. The cable management tray is in planer alignment with the fiber optic equipment tray when the extension is retracted, and allowed to pivot downwardly when the extension is extended. At least one furcation plug tray attaches to the cable management tray. The at least one furcation plug tray adapted to mount at least one furcation plug to which fiber optic cables may be connected.

29 Claims, 42 Drawing Sheets

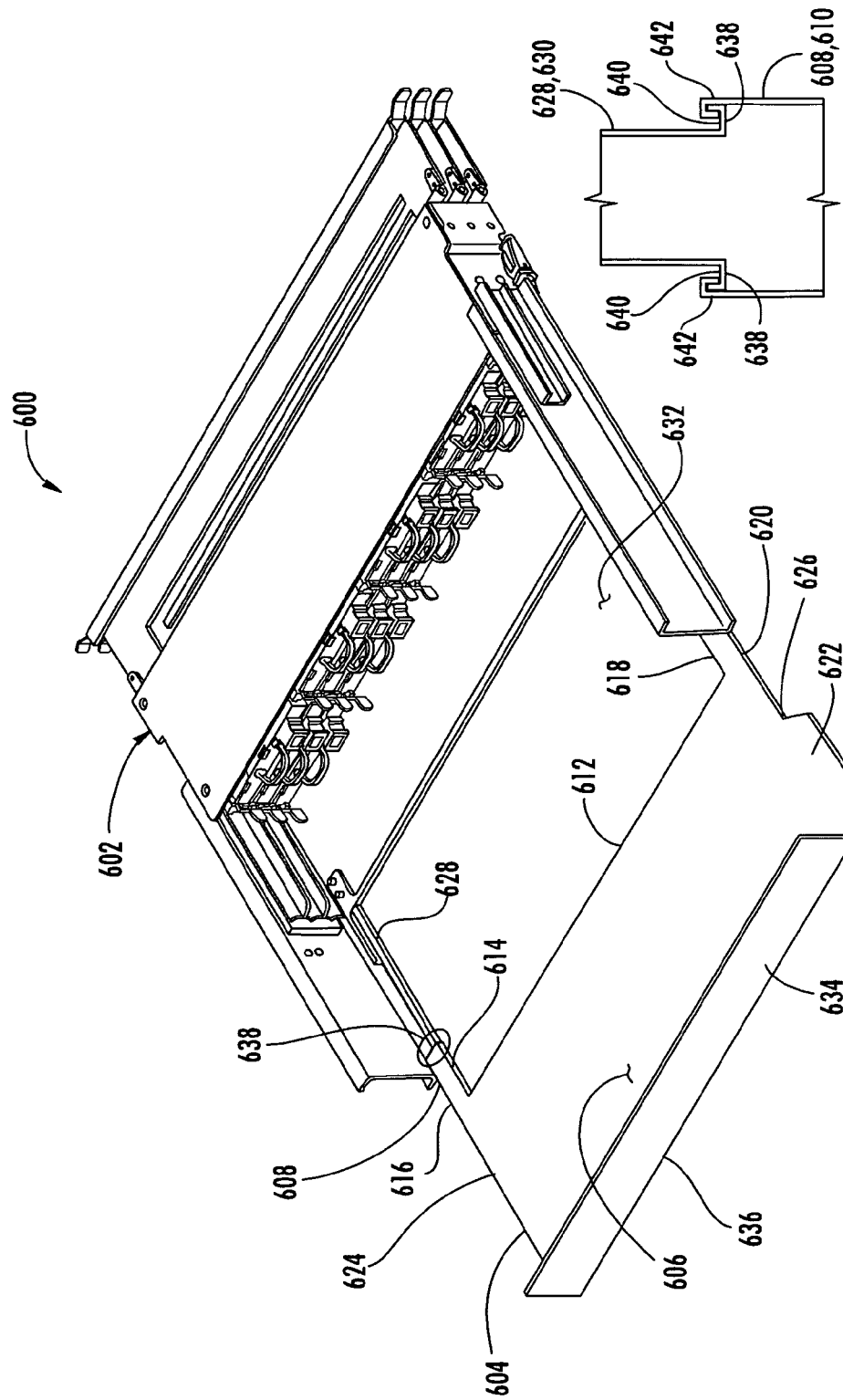

REAR-SLIDABLE EXTENSION IN A FIBER OPTIC EQUIPMENT TRAY

RELATED APPLICATIONS

The present application claims priority to U.S. Provisional Patent Application Ser. No. 61/190,538 filed Aug. 29, 2008 entitled "High Density Data Center Hardware, Assemblies and Components," which is incorporated herein by reference in its entirety.

The present application also claims priority to U.S. Provisional Patent Application Ser. No. 61/197,068 filed Oct. 23, 2008 entitled "High Density Data Center Hardware, Assemblies and Components," which is incorporated herein by reference in its entirety.

The present application is related to co-pending U.S. patent application Ser. No. 12/323,415 entitled "Independently Translatable Modules and Fiber Optic Equipment Trays In Fiber Optic Equipment" which is incorporated herein by reference in its entirety.

The present application is related to co-pending U.S. patent application Ser. No. 12/323,423 entitled "Rear-Installable Fiber Optic Modules and Equipment" which is incorporated herein by reference in its entirety.

BACKGROUND

1. Field of the Disclosure

The technology of the disclosure relates to a fiber optic apparatus, and more particularly to a fiber optic apparatus having a fiber optic equipment tray and an extension that extends from and retracts toward the rear of the fiber optic equipment tray to provide for improved cable and trunk management.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

The fiber optic equipment is customized based on the application need. The fiber optic equipment is typically included in housings that are mounted in equipment racks to maximize space. One example of such fiber optic equipment is a fiber optic module. A fiber optic module is designed to provide cable-to-cable fiber optic connections and manage the polarity of fiber optic cable connections. The fiber optic module is typically mounted to a chassis which is then mounted inside an equipment rack or housing. The chassis may be provided in the form of a tray that is extendable from the equipment rack like a drawer. This allows a technician access to fiber optic adapters disposed in the fiber optic module and any fiber optic cables connected to the fiber optic adapters without removing the fiber optic module from the equipment rack.

Even with advancements in access to fiber optic modules, the labor associated with installing fiber optic modules and making optical connections is significant. For example, for a field technician to install a new fiber optic module, the field technician typically loads trunk cables in the rear section of a fiber optic equipment rack. The field technician then feeds the connectorized fanout legs from the trunk cable to the front of the equipment rack. The field technician then walks around to the front of the equipment rack to connect the fanout legs to a fiber optic module. Because data distribution centers are typically large facilities with significant numbers of equipment racks, walking back and forth from the rear section to the front section of the equipment rack during an installation can take significant time. Alternatively, a second technician may work in tandem with the first technician, where the first technician manages loading of fiber optic cables in the rear section of the equipment rack. The second technician remains in the front of the rack to install the fiber optic modules and establish optical connections between the fiber optic cables and the fiber optic modules. In either scenario, fiber optic cables are installed in the rear section of the equipment rack and the fiber optic modules and connections are installed from the front of the equipment rack thereby requiring extensive labor.

SUMMARY

In one aspect, there is provided a fiber optic apparatus having a fiber optic equipment tray and an extension. The extension is adapted to receive, organize and manage fiber optic cables, including trunk cables, routed to the fiber optic equipment tray. The fiber optic equipment tray has a front, a rear, and a base, and at least one extension rail. The extension movably engages with the fiber optic equipment tray and extends from and retracts toward the rear of the fiber optic equipment tray. The extension may movably engage with the fiber optic equipment tray by attaching to the at least one extension rail and, thereby, slidably extended from and retracting toward the rear of the fiber optic equipment tray. At least one snap pem and locking hole may be used to releasably lock the extension to the fiber equipment tray when in the retracted position.

The extension may comprise a shelf and a cable management tray. The shelf moves over the base when the extension extends from and retracts toward the fiber optic equipment tray. At least one plunger and slot may be used to releasably retain the cable management tray in planar alignment with the fiber optic equipment tray when the extension is retracted. When the extension is extended, the cable management tray may be allowed to pivot downwardly. A pivot stop limits the amount the cable management tray may pivot, which may be at least about 20° or more. The pivot stop may include at least one pivot bracket having a stop groove and a pivot pin. As the cable management tray pivots, the pivot bracket may rotate around the pivot pin until the stop groove contacts a stop pin, thereby limiting the amount of pivot of the cable management tray.

At least one furcation plug tray attaches to the cable management tray. The furcation plug tray is adapted to mount at least one furcation plug. A fiber optic cable having multiple optical fibers, for example a trunk cable, may be received by the extension and connected to a furcation plug mounted on the furcation plug tray. The multiple optical fibers may be furcated by the furcation plug and routed to a connector, adapter and/or module located in the fiber optic equipment tray. The cable management tray may then be pivoted upwardly to be in planar alignment with the fiber optic equipment tray. Further the extension may be retracted towards the fiber optic equipment tray. When the extension is retracted the cable management tray may be releasably retained in planar alignment and the extension may be releasably locked with the fiber optic equipment tray.

In another aspect, there is presented a method of managing fiber optic cables received by a fiber optic apparatus. The method comprises the steps of providing a fiber optic equipment tray having a front and a rear, and providing an extension movably attached to the fiber optic equipment tray. The extension extends from and retracts toward the rear of the fiber optic equipment tray. The extension has a shelf and a cable management tray hingedly attached to the shelf Extending the extension allows the pivoting of the cable management tray to receive one or more fiber optic cable routed to the fiber optic equipment tray. The method also comprises receiving the one or more fiber optic cables by the extension and connecting one or more fiber optic cables to at least one furcation plug mounted on the cable management tray.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIG. 42 is a rear, perspective view of an exemplary embodiment of a fiber optic equipment tray and an extension in an extended or open position.

FIG. 43 is a detail of a stop for extending the extension shown in FIGS. 41 and 42.

DETAILED DESCRIPTION

Reference will now be made in detail to the preferred embodiments, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic equipment that supports one or more rear-installable fiber optic modules. The fiber optic modules are configured to support fiber optic connections. The fiber optic equipment is comprised of a chassis defining a front end and a rear section. At least one guide system is disposed in the chassis and configured to receive at least one fiber optic module. The guide system may be provided in the form of a rail guide system. The guide system receives a fiber optic module from the rear section of the chassis and is configured to guide the fiber optic module toward the front end of the chassis. In this manner, a technician can make fiber optic connections to fiber optic modules and also install the fiber optic modules into the fiber optic equipment from the rear section of the chassis to reduce time and/or labor in making fiber optic connections.

In some disclosed embodiments, the guide system is comprised of at least one tray guide that receives at least one fiber optic equipment tray. The tray guides are disposed in the chassis of the fiber optic equipment. The tray guides support fiber optic equipment trays within the fiber optic equipment. At least one module guide is disposed in the fiber optic equipment trays to support one or more fiber optic modules. In this manner, the fiber optic equipment tray can translate within the chassis to move the fiber optic modules supported by the fiber optic equipment tray about the chassis. The module guides also allow fiber optic modules to be rear-installable into the fiber optic equipment tray to be rear-installable in the fiber optic equipment. The tray guides disposed in the fiber optic equipment tray also allow the fiber optic modules disposed therein to be independently translated within the fiber optic equipment tray.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals.

Figure 1:
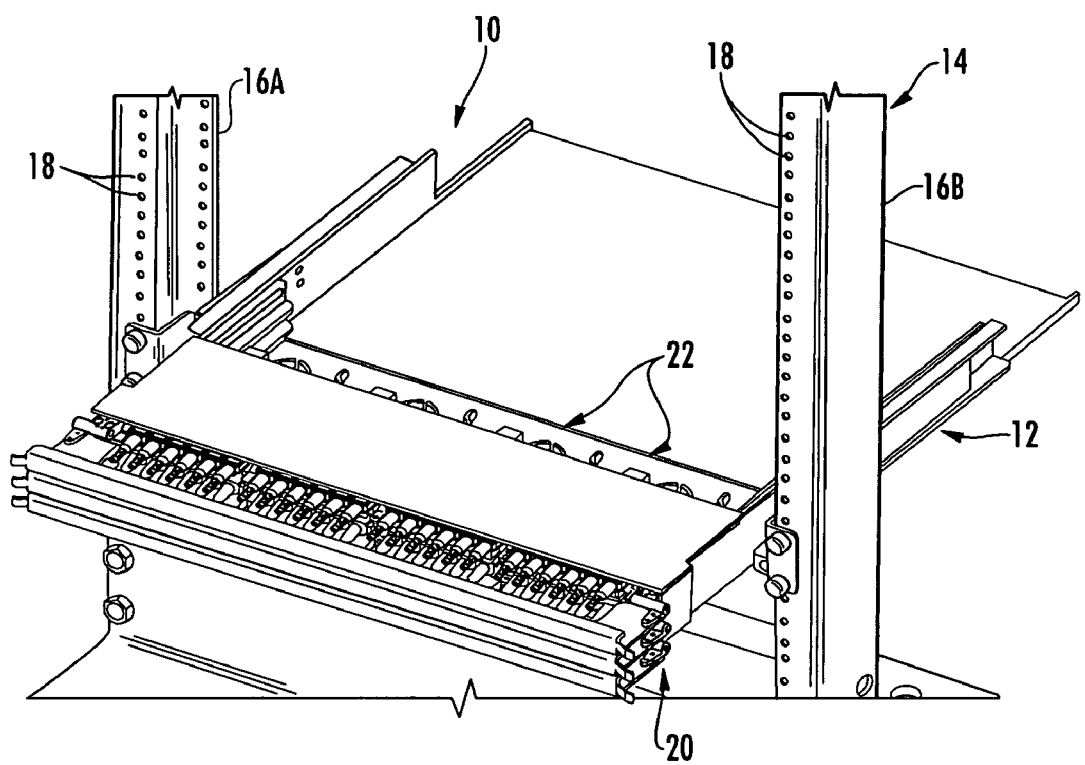
FIG. 1 is a front perspective view of an exemplary fiber optic equipment rack with exemplary fiber optic equipment supporting rear-installable fiber optic modules according to one embodiment.

FIG. 1 illustrates an exemplary fiber optic equipment 10 in this regard. The exemplary fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more rear-installable fiber optic modules. The fiber optic modules can be fiber optic adapter modules or any other type of fiber optic modules or fiber optic apparatuses, including those that support fiber optic connections. Both the fiber optic modules and the fiber optic equipment trays are rear-installable, meaning they can be installed from a rear section of the fiber optic equipment 10. Further, both the fiber optic equipment trays and the fiber optic modules supported therein are independently translatable about the chassis for installation, access, and/or removal.

In this regard and as illustrated in FIG. 1, the fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the fiber optic equipment 10 inside the fiber optic equipment rack 14. The fiber optic equipment 10 is attached and supported by the fiber optic equipment rack 14 in the form of shelves that are stacked on top of each other within the vertical rails 16A, 16B. As illustrated, the fiber optic equipment 10 is attached to the vertical rails 16A, 16B. The fiber optic equipment rack 14 may support 1U-sized shelves, with "U" equal a standard 1.75 inches in height. As will be discussed in greater detail later in this application, the fiber optic equipment 10 includes a plurality of extendable fiber optic equipment trays 20 that each carries one or more rear-installable fiber optic modules 22. In this example, the fiber optic equipment 10 provides a density of 144 fibers, although it is not limited to this density. Further, as will also be described in more detail below, each fiber optic equipment tray 20 is independently translatable and accessible to access the fiber optic modules supported therein.

FIG. 2A illustrates a rear perspective view of the fiber optic equipment 10 illustrated in FIG. 1. The fiber optic equipment 10 is provided in the chassis 12 that defines a front end 24, a rear section 26, a first end 28, and a second end 30. The first end 28 of the chassis 12 is disposed on the opposite side of the second end 30 of the chassis 12. A guide system in the form of a rail guide system 32 is provided to support the rear-installable fiber optic modules 22. The rail guide system 32 comprises two tray rail guides 32A, 32B attached to the chassis 12 on the first end 28 and the second end 30, respectively. The tray rail guides 32A, 32B are configured to support one or more fiber optic equipment trays that support the fiber optic modules 22, which will be illustrated in FIG. 3 and described below. The tray rail guides 32A, 32B allow each fiber optic equipment tray 20 installed therein to be translated about the chassis 12. In this example, the chassis 12 supports three (3) fiber optic equipment trays 20 with each one stacked on top of each other. A tray cover 34 is disposed on top of the top fiber optic equipment tray 20 disposed in the chassis 12 and within the tray rail guides 32A, 32B. As will be discussed later in this application, each fiber optic equipment tray 20 contains a fiber routing tray 36 attached thereto to support routing of optical fibers connected to the fiber optic modules 22. The fiber routing tray 36 can be extended and lowered as desired to obtain access to the fiber optic modules 22 from the front end 24 of the fiber optic equipment 10.

FIG. 2B illustrates the tray rail guides 32A, 32B in more detail. As illustrated therein, the tray rail guides 32A, 32B form a series of channels 38A-38C, wherein each channel 38A-38C is configured to receive a fiber optic equipment tray 20. The tray rail guides 32A, 32B allow a plurality of fiber optic trays 20 arranged in a column format. The tray rail guides 32A, 32B comprise an end portion 40 by which the channels 38A-38C stop and the fiber optic equipment trays 20 cannot extend beyond. This end portion 40 is disposed in an orientation such that it is adjacent the rear section 26 of the fiber optic equipment 10. The tray rail guides 32A, 32B also contain an entry portion 42 through which the fiber optic equipment trays 20 can be inserted into the channels 38A-38C. Note that the entry portion 42 does not close off the channels 38A-38C such that the fiber optic equipment trays 20 can be extended beyond the entry portion 42 back towards the rear section 26 of the chassis 12. In this manner, the tray rail guides 32A, 32B support rear installation of fiber optic equipment trays 20 into the chassis 12 from the rear section 26.

Figure 3:
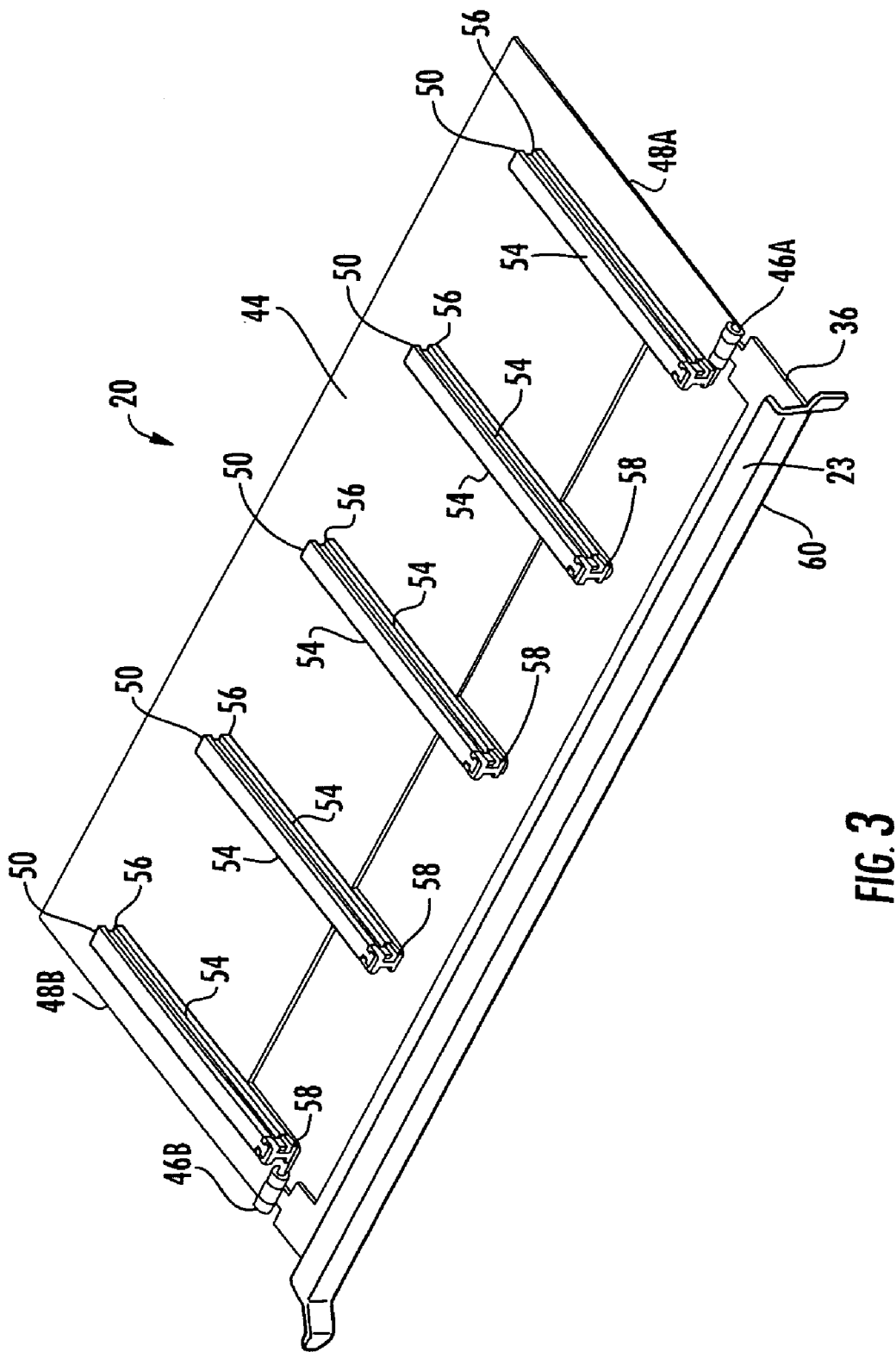
FIG. 3 is a front perspective view of an individual fiber optic equipment tray in the fiber optic equipment of FIG. 1 without rear-installable fiber optic modules installed in module guides disposed in the fiber optic equipment tray.

FIG. 3 illustrates an individual fiber optic equipment tray 20 not disposed in the chassis 12 or contained within the tray rail guides 32A, 32B for further discussion and illustration. As illustrated therein, the fiber optic equipment tray 20 contains a main tray portion 44 and the fiber routing tray 36 attached thereto. The fiber routing tray 36 is attached to the main tray portion 44 via hinge mechanisms in the form of hinges 46A, 46B disposed on each end 48A, 48B of the main tray portion 44. The main tray portion 44 contains a plurality of module guides in the form of module rail guides 50 that support the fiber optic modules 22. More specifically, the fiber optic modules 22 contain rails (elements 52A, 52B in FIG. 4) that couple to tray channels 54 disposed within the module rail guides 50. The fiber optic modules 22 are disposed in a row arrangement if at least one intermediate module rail guide 50 is disposed in the fiber optic equipment tray 20. Providing a plurality of tray channels 54 in each module rail guide 50 allows a plurality of fiber optic modules 22 to be stacked on top of each other in a column arrangement. The fiber optic modules 22 can be moved within the module rail guides 50 in the fiber optic equipment tray 20 either towards the front end 24 of the chassis 12 or the rear section 26 or the chassis 12. The fiber optic equipment trays 20 can also be moved about the tray rail guides 32A, 32B. In this manner, the fiber optic equipment trays 20 can be translated independently of each other about the tray rail guides 32A, 32B, and each of the fiber optic modules 22 within a given fiber optic equipment tray 20 can be independently translated within their respective module rail guides 50.

Note that in FIG. 3, the fiber optic equipment tray 20 contains five (5) module rail guides 50, which means that the fiber optic equipment tray 20 can support four (4) individual fiber optic modules 22. Four (4) fiber optic modules 22 can be installed in the fiber optic equipment tray 20 of FIG. 3, or less than four as desired or as required according to installation requirements. Also as shown in FIG. 3 and as illustrated in more detail in FIG. 4, the module rail guides 50 are configured such that the tray channels 54 are open on a rear end 56 of the module rail guides 50. This allows the fiber optic modules 22 to be rear-installable into the fiber optic equipment trays 20 from the rear section 26 of the chassis 12. More specifically, the fiber optic equipment tray 20 is disposed in the chassis 12 such that the rear ends 56 of the module rail guides 50 are oriented towards the rear section 26 of the chassis 12. Thus, as will be discussed in more detail below, the fiber optic modules 22 can be inserted into the rear ends 56 of the module rail guides 50 and pushed forward within the module rail guides 50 until the fiber optic modules 22 reach a front end 58 of each module rail guide 50. A locking feature not illustrated in FIG. 3, but described later below in this application, can be provided to prevent the fiber optic module 22 from extending beyond the front end 58 of the module rail guides 50 unless a release is engaged. In this manner, the fiber optic modules 22 can be installed from the rear of the chassis 12, but can also be extended and removed from the front end 24 of the chassis 12 as well.

Also as illustrated in FIG. 3, the fiber routing tray 36 is formed from sheet metal or other material that is bent on top of itself in a U-shape on a front end 60 of the fiber routing tray 36. In this manner, optic fibers extending from the fiber optic modules 22 installed in the fiber optic equipment tray 20, and in particular the module rail guides 50 disposed therein, can be routed underneath a lip section 23 contained in the fiber routing tray 36 and disposed to either end 48A, 48B of the fiber optic equipment tray 20 to be routed for connection to other fiber optic equipment.

Figure 2:
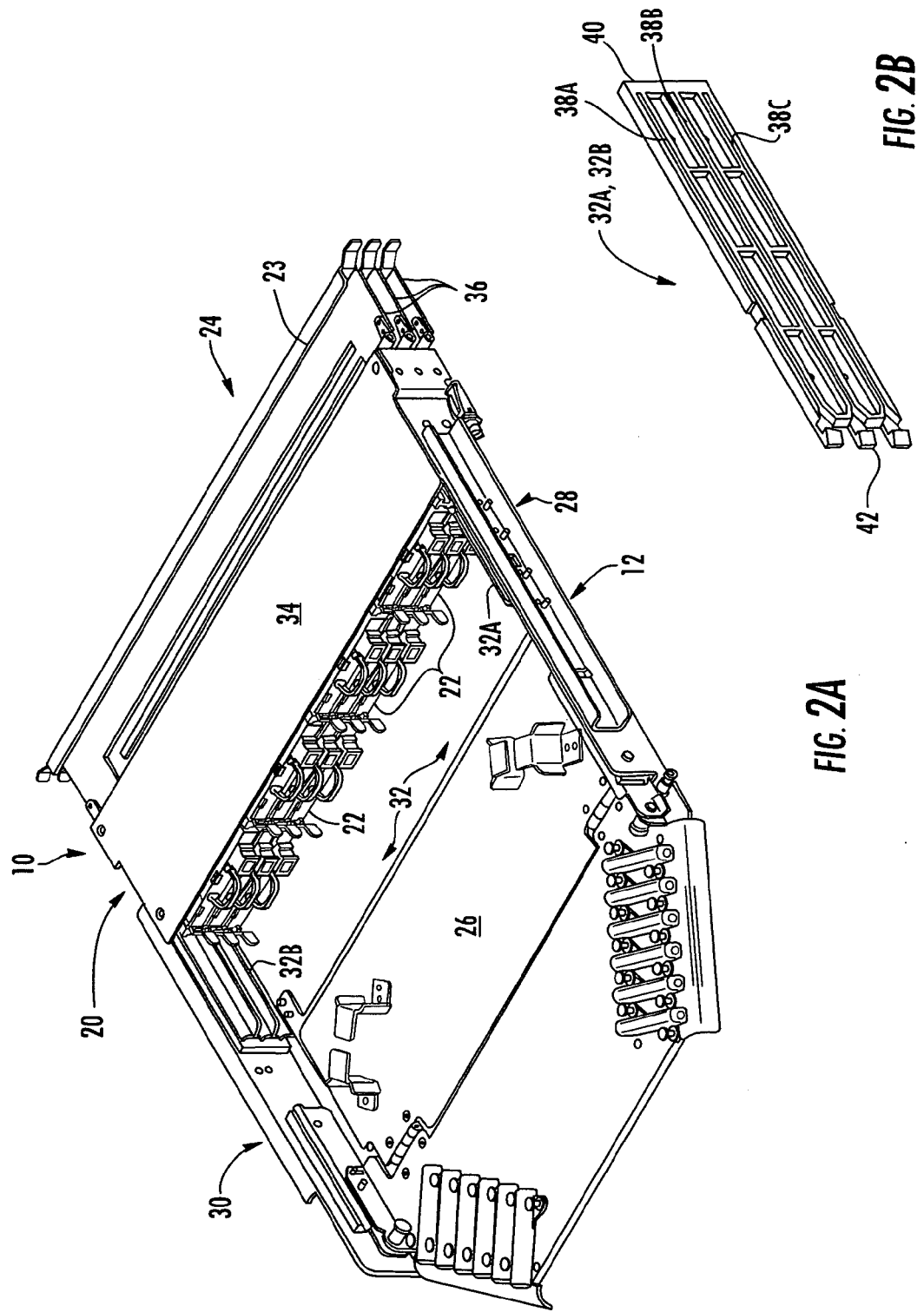
FIG. 2A is a rear perspective view of the fiber optic equipment supporting the rear-installable fiber optic modules of FIG. 1.
FIG. 2B is a perspective view of fiber optic equipment tray guides disposed in the fiber optic equipment of FIG. 1.
Figure 4:
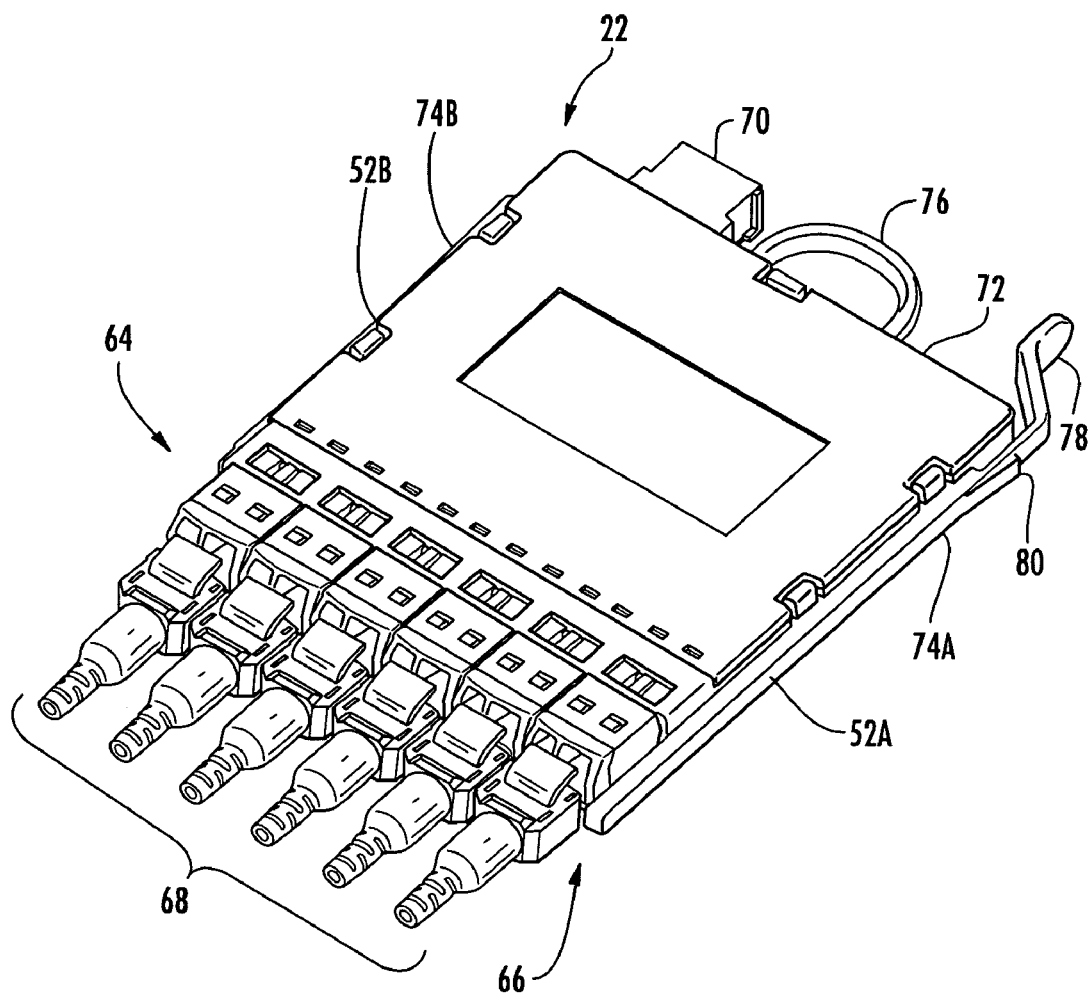
FIG. 4 is a front perspective view of a fiber optic module that is rear-installable in the fiber optic equipment tray of FIG. 3.

FIG. 4 illustrates an example of a fiber optic module 22 that is supported in the fiber optic equipment tray 20 in FIGS. 1-3. As illustrated therein, the fiber optic module 22 is comprised of a number of fiber optic adapters 64 disposed on a front end 66 of the fiber optic module 22. In this example, the fiber optic adapters 64 accept duplex LC fiber optic connectors 68. However, any fiber optic connection type desired can be provided in the fiber optic modules 22. Fiber optic cables (not shown) extend from the fiber optic connectors 68 to establish fiber optic connections with other equipment. Another fiber optic adapter 70 is disposed on a rear end 72 of the fiber optic module 22. In this example, the fiber optic adapter 70 is an MTP fiber optic adapter equipped to establish connections to up to twelve (12) optical fibers. The fiber optic module 22 may also manage polarity between the fiber optic connectors 68 and the fiber optic adapters 64 disposed on the front end 66 of the fiber optic module 22 and the fiber optic adapter 70 disposed on the rear end 72 of the fiber optic module 22.

Module rails 52A, 52B are disposed on each side 74A, 74B of the fiber optic module 22. The module rails 52A, 52B are configured to be inserted within the tray channels 54 of the module rail guides 50 in the fiber optic equipment tray 20 as illustrated in FIG. 3. In this manner, when it is desired to install the fiber optic module 22 in the fiber optic equipment tray 20, the front end 66 of the fiber optic module 22 can be inserted from the rear section 26 of the chassis 12. More specifically, the front end 66 of the fiber optic module 22 is inserted into the tray channels 54 of the module rail guides 50 at their rear ends 56. In this manner, the fiber optic module 22 is rear-installable in the fiber optic equipment tray 20 and the chassis 12. The fiber optic module 22 can then be pushed forward within the tray channels 54 until the fiber optic module 22 reaches the front end 58 of the module rail guides 50. In this manner, a technician can install a fiber optic connection to the fiber optic adapter 70 disposed on the rear end 72 of the fiber optic module 22 and can then install the fiber optic module 22 from the rear section 26 of the chassis 12 into the fiber optic equipment tray 20.

Figure 5:
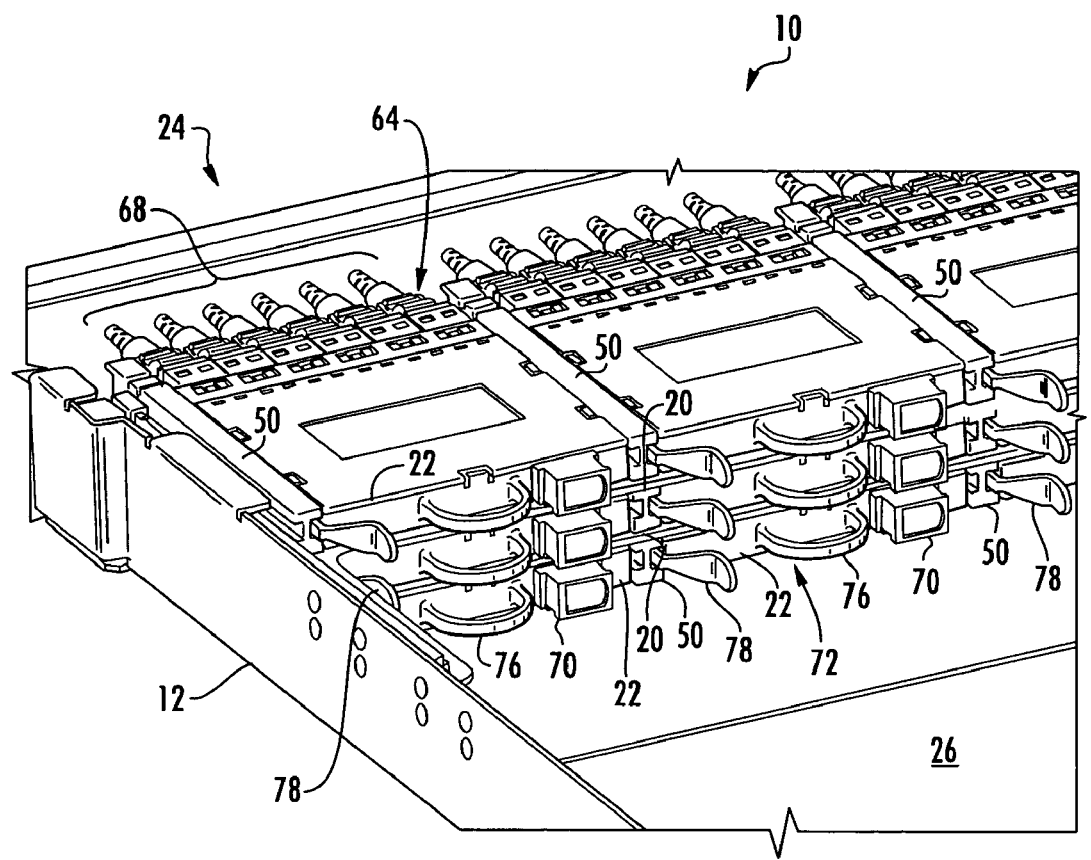
FIG. 5 is a rear perspective close-up view of the rear-installable fiber optic module of FIG. 4 installed in the fiber optic equipment tray of FIG. 3.

In this regard, FIG. 5 illustrates a rear perspective view of the fiber optic modules 22 installed in the fiber optic equipment trays 20 and the module rail guides 50 disposed therein. As illustrated therein, when the fiber optic module 22 is installed in the tray channels 54 of the module rail guides 50 from the rear section 26 of the chassis 12, the module rails 52A, 52B of the fiber optic module 22 move towards the front end 24 within the tray channels 54. The fiber optic module 22 can be moved towards the front end 24 until the fiber optic modules 22 reach a stop or locking feature disposed in the front end 24 as will described later in this application. A locking feature in the form of a locking latch 78 and a protrusion 80 (FIG. 4) engage a complementary protrusion disposed in the tray channel 54 such that the fiber optic module 22. The locking latch 78 is inwardly biased such that the fiber optic module 22 can be installed in the tray rail guides 32, but cannot be pulled back towards the rear section 26 of the chassis 12 until the locking latch 78 is disengaged to prevent the protrusion 80 from engaging with the module rail guides 50. The locking latch 78 is disengaged by pushing it inward towards the fiber optic module 22 to release the protrusion 80 from the tray channel 54.

If it is desired to remove the fiber optic module 22 from the fiber optic equipment tray 20, the fiber optic module 22 can be removed from either the rear section 26 of the chassis 12 or from the front end 24 of the chassis 12. To remove the fiber optic module 22 from the rear section 26 of the chassis 12, a pulling loop 76 disposed in the rear end 72 of the fiber optic module 22 can be pulled once the locking latch 78 is disengaged inward. The locking latch 78 controls the position of the protrusion 80 extending outward from the module rail 52A such that when the fiber optic module 22 is extended along a certain portion of the module rail guides 50, the protrusion 80 prevents the fiber optic module 22 from moving backwards along the tray channels 54 towards the rear section 26 of the chassis 12.

Figure 6:
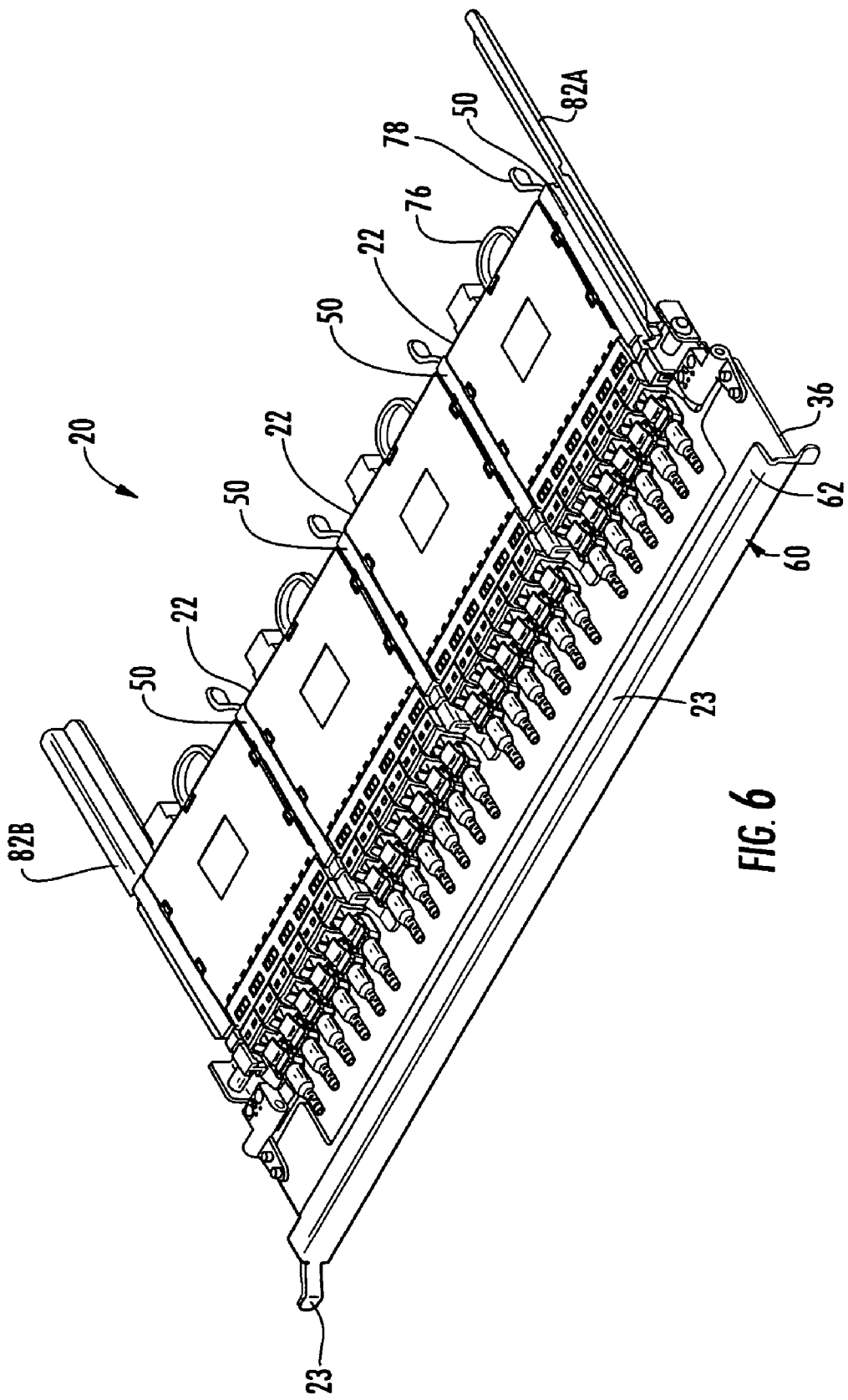
FIG. 6 is a front perspective view of the fiber optic equipment tray of FIG. 3 with rear-installable fiber optic modules installed in the module guides.

FIG. 6 illustrates the fiber optic equipment tray 20 of FIG. 3; however, with the rear-installable fiber optic modules 22 installed therein. The fiber optic modules 22 are installed in the module rail guides 50 disposed in the fiber optic equipment tray rails 82A, 82B. These fiber optic equipment tray rails 82A, 82B are configured to be disposed in the module rail guides 32A, 32B attached to the chassis 12 as illustrated in FIG. 2A such that the fiber optic equipment tray 20 is translatable with respect to the chassis 12.

Figure 7:
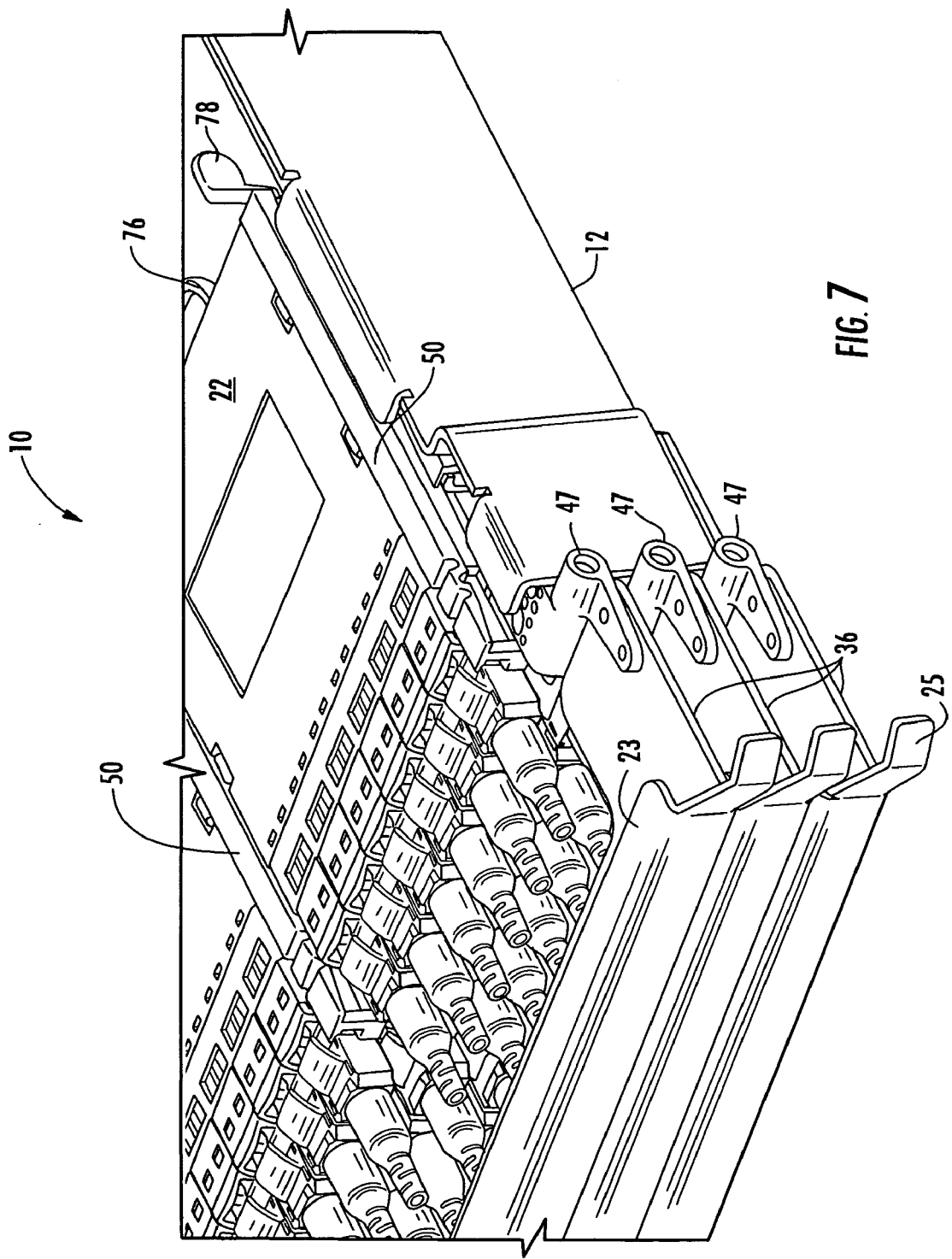
FIG. 7 is a front perspective close-up view of the fiber optic equipment tray of FIG. 3 with rear-installable fiber optic modules installed in the module guides.
Figure 8:
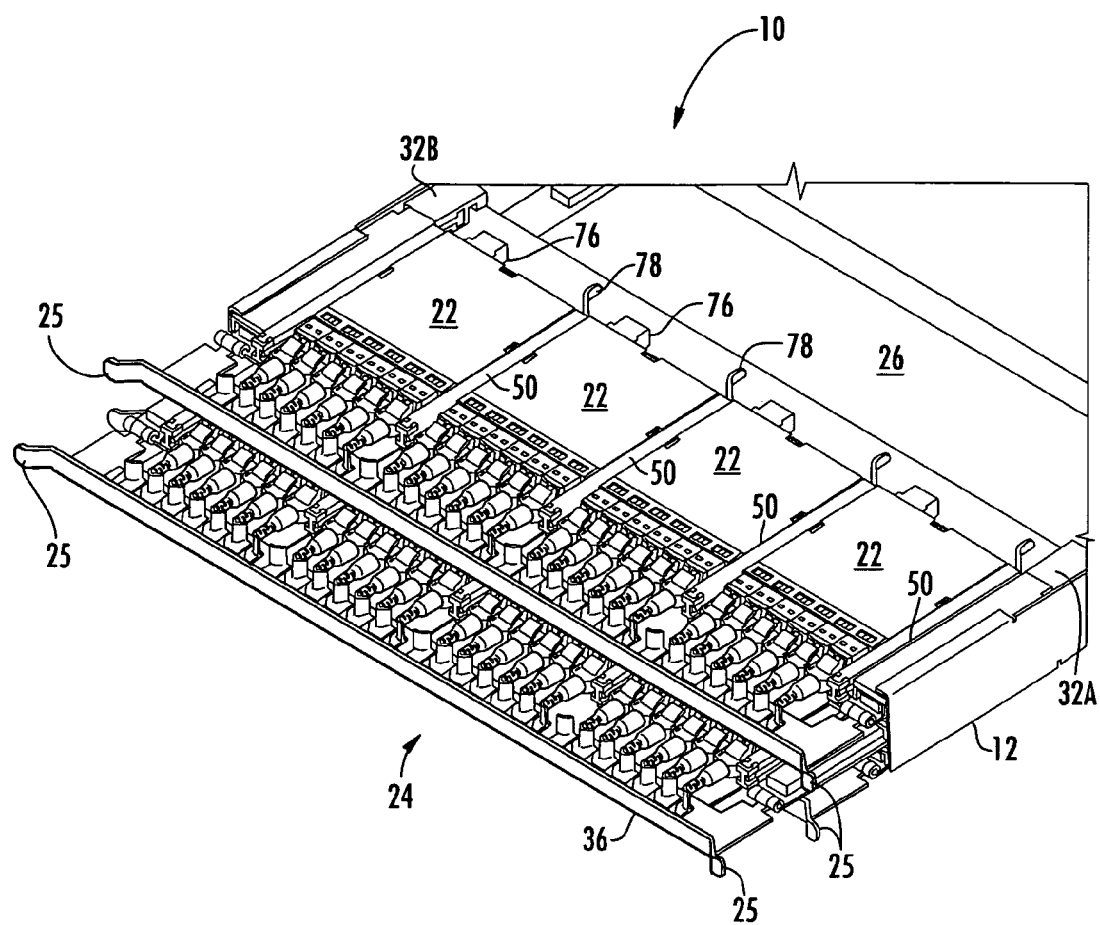
FIG. 8 is a front perspective view of a fiber optic equipment tray extended from the fiber optic equipment.
Figure 9:
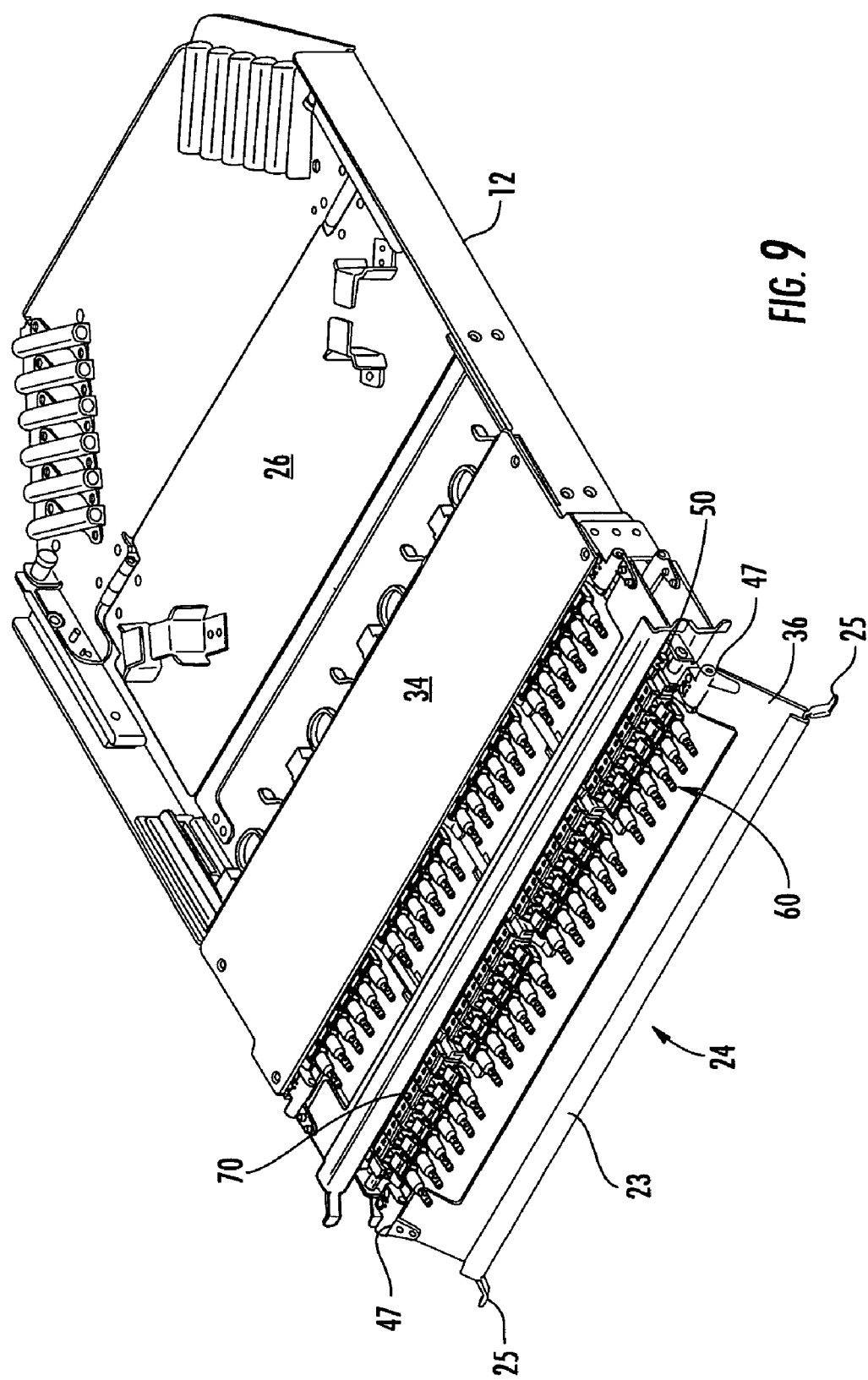
FIG. 9 is a front perspective view of a fiber routing guide tray of a fiber optic equipment tray lowered to obtain front access to the fiber optic modules supported in the fiber optic equipment tray.

FIG. 7 illustrates a front perspective view of the fiber optic equipment tray 20 in FIG. 6 in more detail. As illustrated therein, three (3) fiber optic equipment trays 20 are disposed within the tray rail guides 32A, 32B of the chassis 12. As illustrated therein, the hinges 46A, 46B that hingedly attach the fiber routing tray 36 to the fiber optic equipment trays 20 are provided in the form of position hinges 47. The position hinges 47 are configured to engage with the module rail guides 50 such that the fiber optic module 22 cannot be extended forward when the position hinges 47 are engaged. If it is desired to access the fiber optic module 22, the pulling tab 25 attached to the fiber routing tray 36 can be pulled forward to cause the fiber optic equipment tray 20 to extend forward from the front end 24 of the chassis 12 as illustrated in FIG. 8. Thereafter, the fiber routing tray 36 can be tilted downward as illustrated in FIG. 9. When the fiber optic equipment tray 20 and its fiber routing tray 36 are tilted downward, the position hinges 47 on each side of the fiber optic equipment tray 20 are disengaged with the module rail guides 50 for that particular fiber optic equipment tray 20 such that the fiber optic modules 22 supported by that fiber optic equipment tray 20 can be removed from the front end 24 of the chassis 12. Also, by allowing the fiber routing tray 36 to be tilted downward, unobstructed access can be obtained to the fiber optic module adapter 70 and fiber optic connectors 68 for establishing or disconnecting fiber optic connections.

Figure 10:
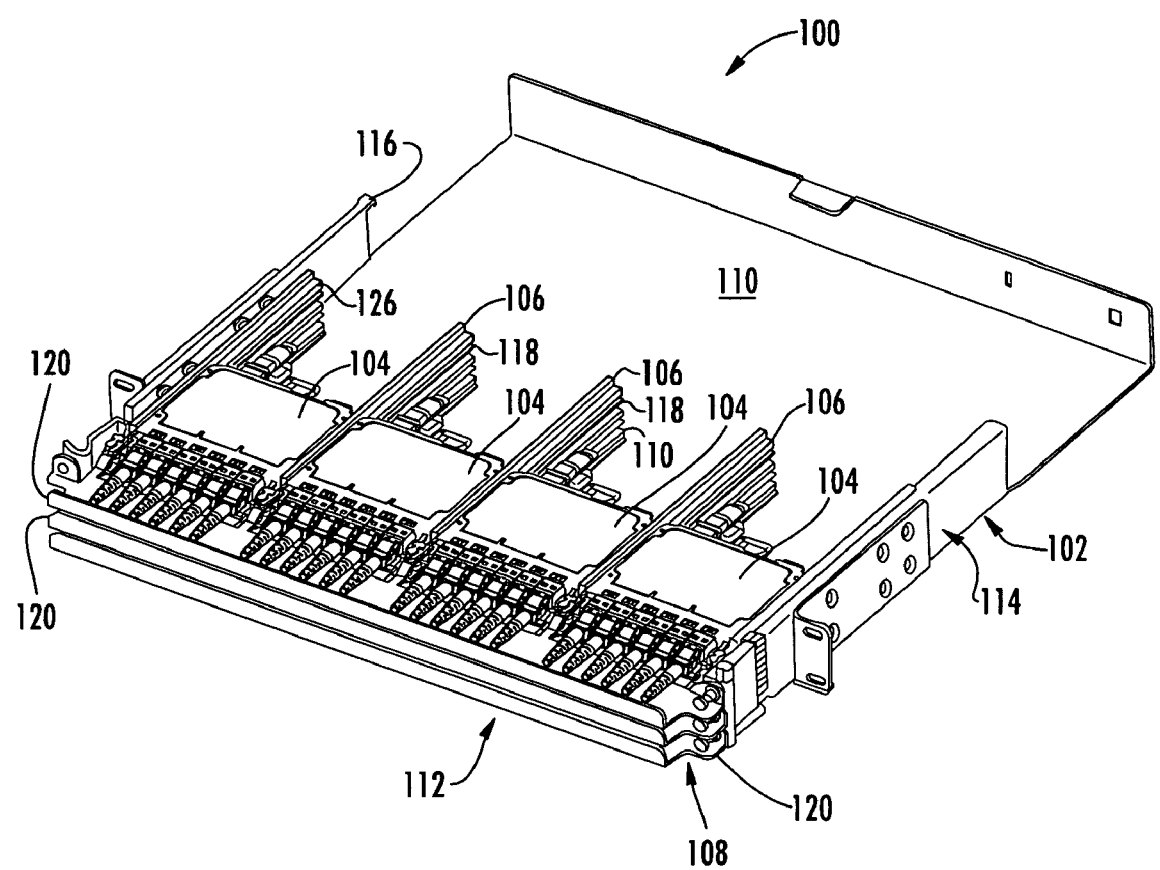
FIG. 10 is a front perspective view of another exemplary fiber optic equipment supporting rear-installable fiber optic modules disposed in module guides.

A plurality of fiber optic modules can also be disposed in a module guide system in the fiber optic equipment without need or requirement for an intermediate fiber optic equipment tray. In this manner, each of the fiber optic modules translates independently of other fiber optic modules disposed within the module guide system. In this regard, FIG. 10 illustrates another embodiment of fiber optic equipment 100. Fiber optic equipment 100 includes a module guide system disposed in a chassis 102 that supports rear-installable fiber optic modules. As will be described later in this application, the fiber optic equipment 100 provides an alternative guide system for rear-installable fiber optic modules. In FIG. 10, fiber optic modules 104 are supported within module rail guides 106 disposed in a chassis 102 of the fiber optic equipment 100. This is opposed to the fiber optic equipment 10 in FIGS. 1-9, wherein fiber optic modules are disposed in intermediate fiber optic equipment trays attached to a chassis. In this manner and as illustrated in FIG. 10, the fiber optic equipment 100 allows fiber optic modules 104 to be inserted into module rail guides 106 disposed in the chassis 102 and independently translated about the module rail guides 106.

Turning to FIG. 10, a plurality of rear installable fiber optic modules 104 are installed in the fiber optic equipment 100. The fiber optic modules 104 are supported by a plurality of module rail guides 106. Unlike the fiber optic equipment 10 of FIG. 1, the module rail guides 106 are attached directly to the chassis 102. Fiber optic equipment trays 108 are still provided to support the forward translation of the fiber optic modules 104 from the fiber optic equipment 100. As will be described later in this application, when the fiber optic modules 104 are installed from a rear section 110 of the chassis 102 into the module rail guides 106. The fiber optic modules 104 can then be moved forward within the module rail guides 106 to a front end 112 of the chassis 102. The fiber optic modules 104 will then engage with a latch (not shown) that will then attach the fiber optic modules 104 to fiber optic equipment trays 108. In this manner, when the fiber optic equipment tray 108 is pulled forward from the chassis 102, the fiber optic module 104 will also move outward with the fiber optic equipment tray 108 due to the interlock between the fiber optic modules 104 and the fiber optic equipment tray 108, although is still supported by the module rail guides 106. Thus, in the fiber optic equipment 100 in FIG. 10, the fiber optic equipment trays 108 are independently movable with respect to the chassis 102; however, the fiber optic modules 104 are not independently movable within the fiber optic equipment tray 108 like provided in the fiber optic equipment 10 of FIG. 1.

The chassis 102 also comprises a first end 114 and a second end 116, wherein the second end 116 is disposed on the opposite side from the first end 114. A plurality of module rail guides 106 are disposed within the chassis 102 between the first end 114 and the second end 116. A minimum of two (2) module rail guides 106 are required to support at least one (1) fiber optic module 104. However, as illustrated in FIG. 10, five (5) module rail guides 106 are provided to support four (4) fiber optic modules 104 per level. As will be described later in this application in more detail, the module rail guides 106 can contain a plurality of channels 118 to support more than one level or plane of fiber optic modules 104. In the example of the fiber optic equipment 100 in FIG. 10, three (3) levels of fiber optic modules 104 are provided; thus, three (3) channels 118 are provided in each module rail guide 106. The fiber optic equipment trays 108 each contain a routing tray 120 that can be pulled in order to remove a fiber optic equipment tray 108 from the chassis 102.

Figure 11:
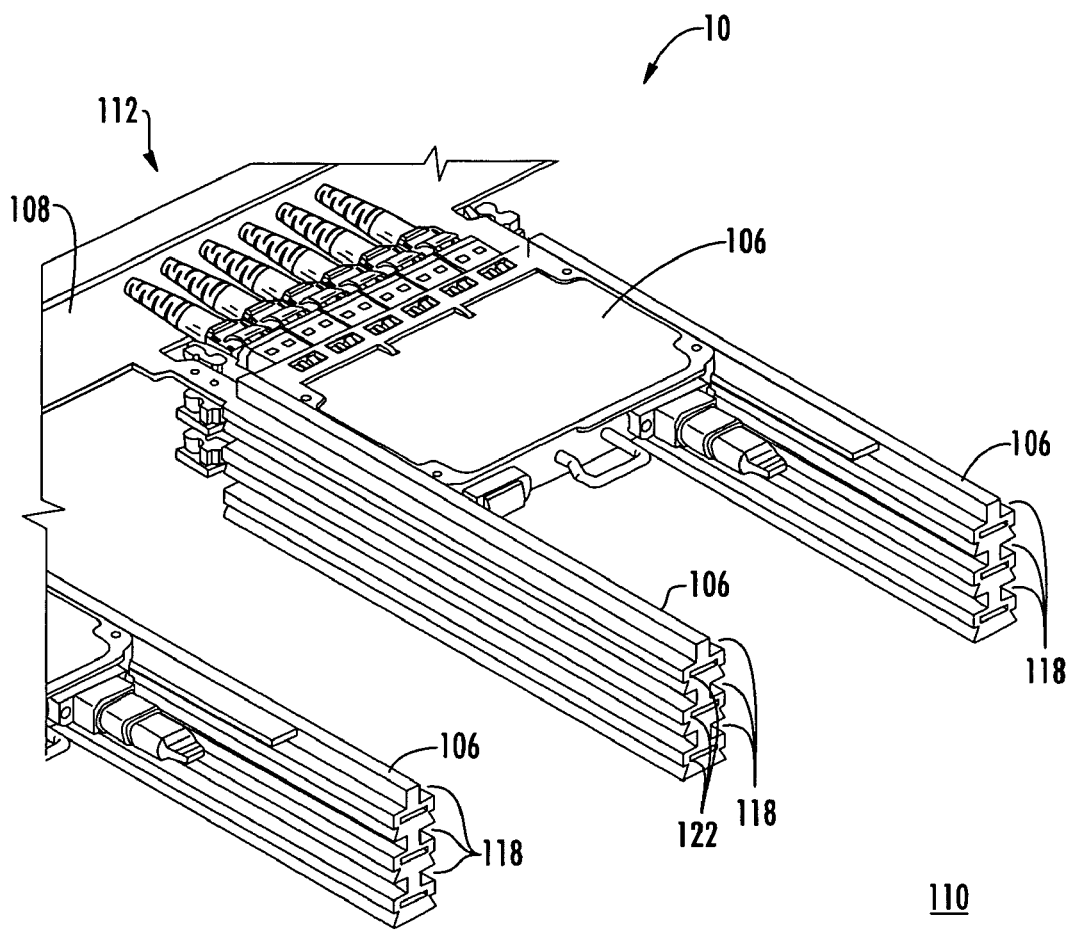
FIG. 11 is a rear perspective view of the fiber optic equipment supporting the rear-installable fiber optic modules of FIG. 10.

FIG. 11 illustrates a rear perspective view of the module rail guides 106 disposed within the chassis 102 and how the fiber optic module 104 is installed from the rear section 110 of the chassis 102. Further, FIG. 11 illustrates how the fiber optic equipment trays 108 are also supported by the module rail guides 106 and how the fiber optic modules 104 attach to the fiber optic equipment trays 108 when pulled forward. As illustrated in FIG. 11, the module rail guides 106 are provided wherein a fiber optic module 104 can be inserted from the rear section 110 into the channels 118. The fiber optic module 104 can then be pushed forward with the module rail guides 106 towards the front end 112 of the chassis 102. The module rail guides 106 also contain a series of tray guides 122 disposed in the plane substantially orthogonal to the channels 118 to receive fiber optic equipment trays 108, although any orientation is possible.

Figure 12:
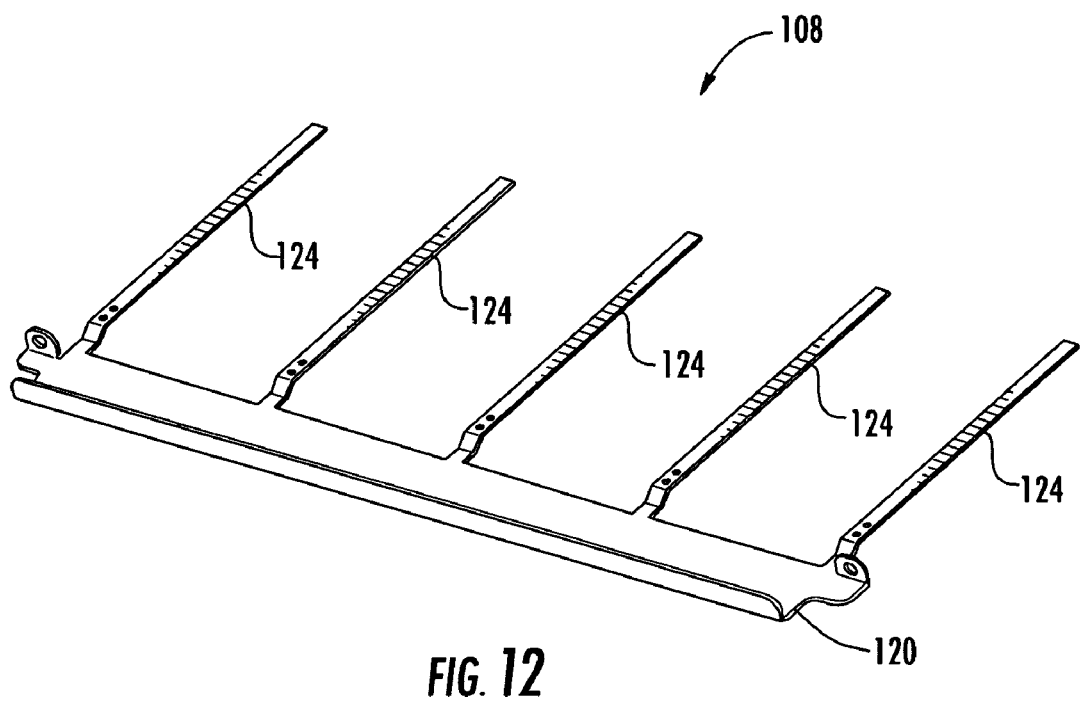
FIG. 12 is a front perspective view of an individual fiber optic equipment tray in the fiber optic equipment of FIG. 10.
Figure 13:
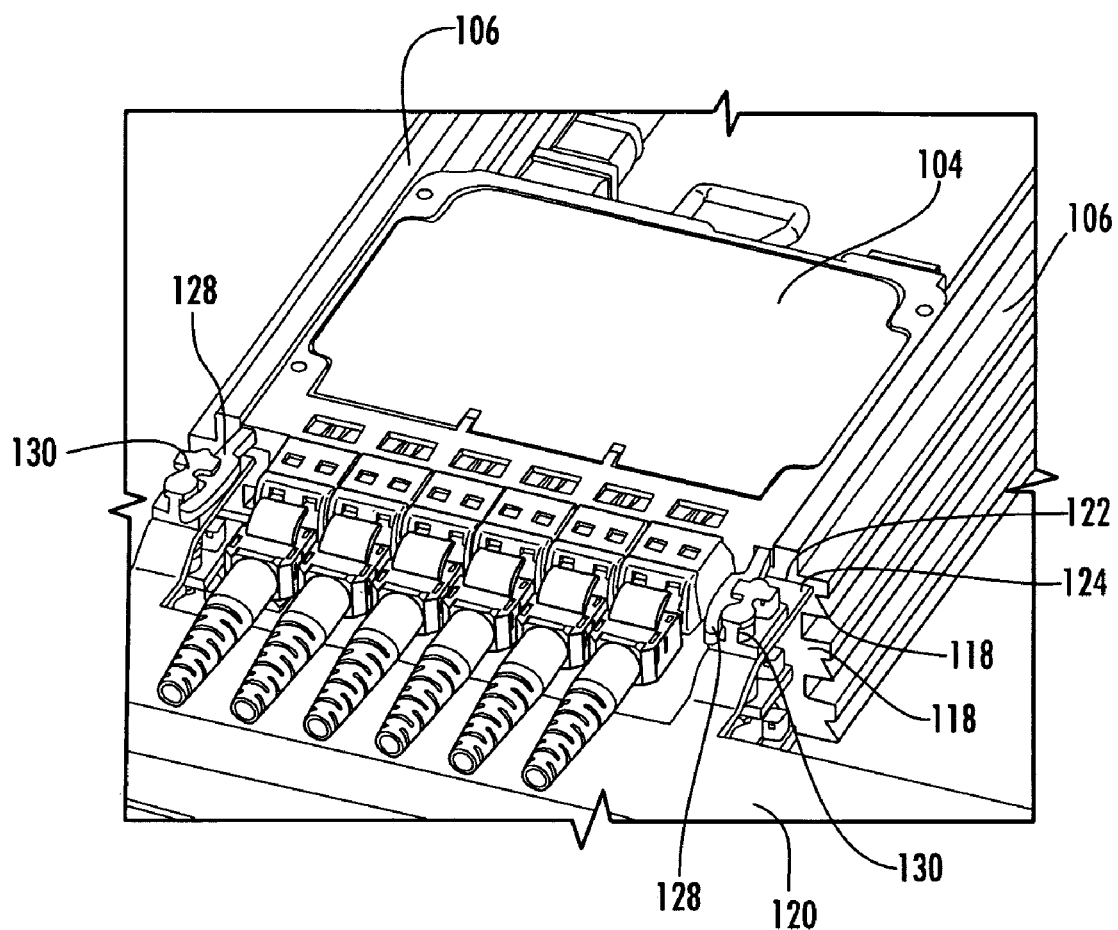
FIG. 13 is a rear perspective view of the rear-installable fiber optic module installed in the module guides disposed in the fiber optic equipment of FIG. 10.
Figure 14:
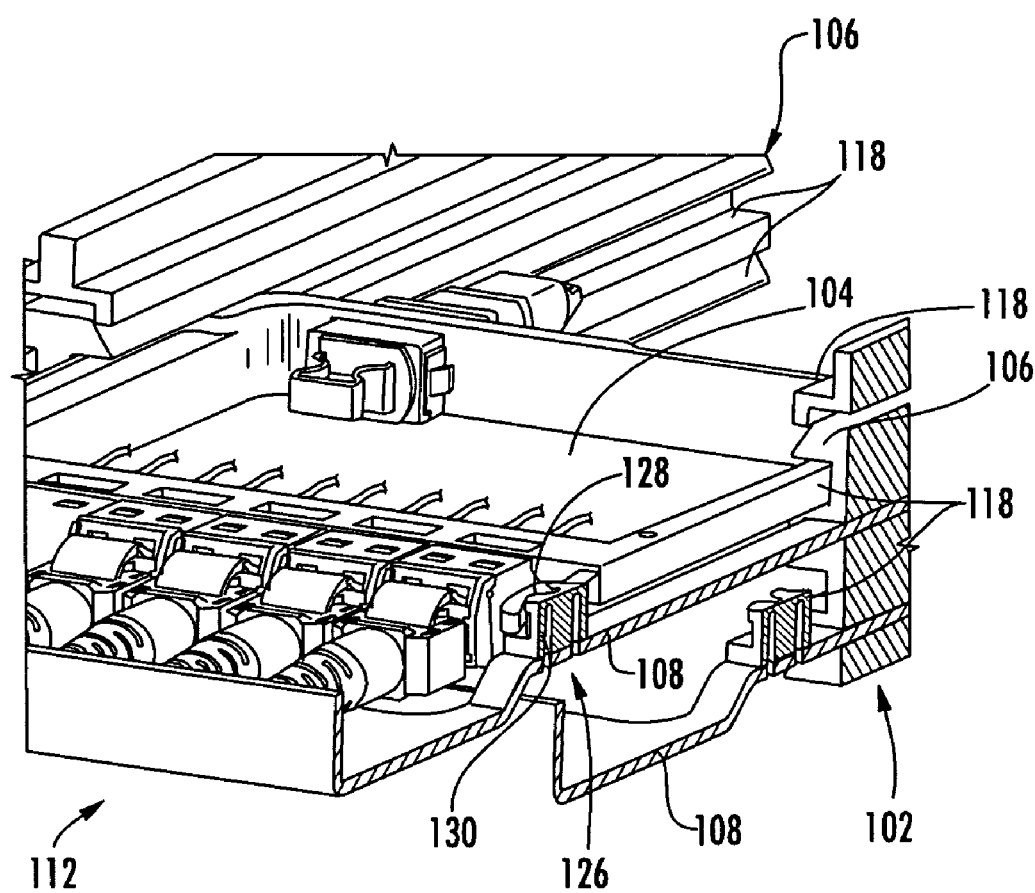
FIG. 14 is a rear perspective close-up view of the rear-installable fiber optic module disposed within module guides in the fiber optic equipment of FIG. 10 and locked into the fiber optic equipment tray of FIG. 12 when the fiber optic module is pulled forward.
Figure 15:
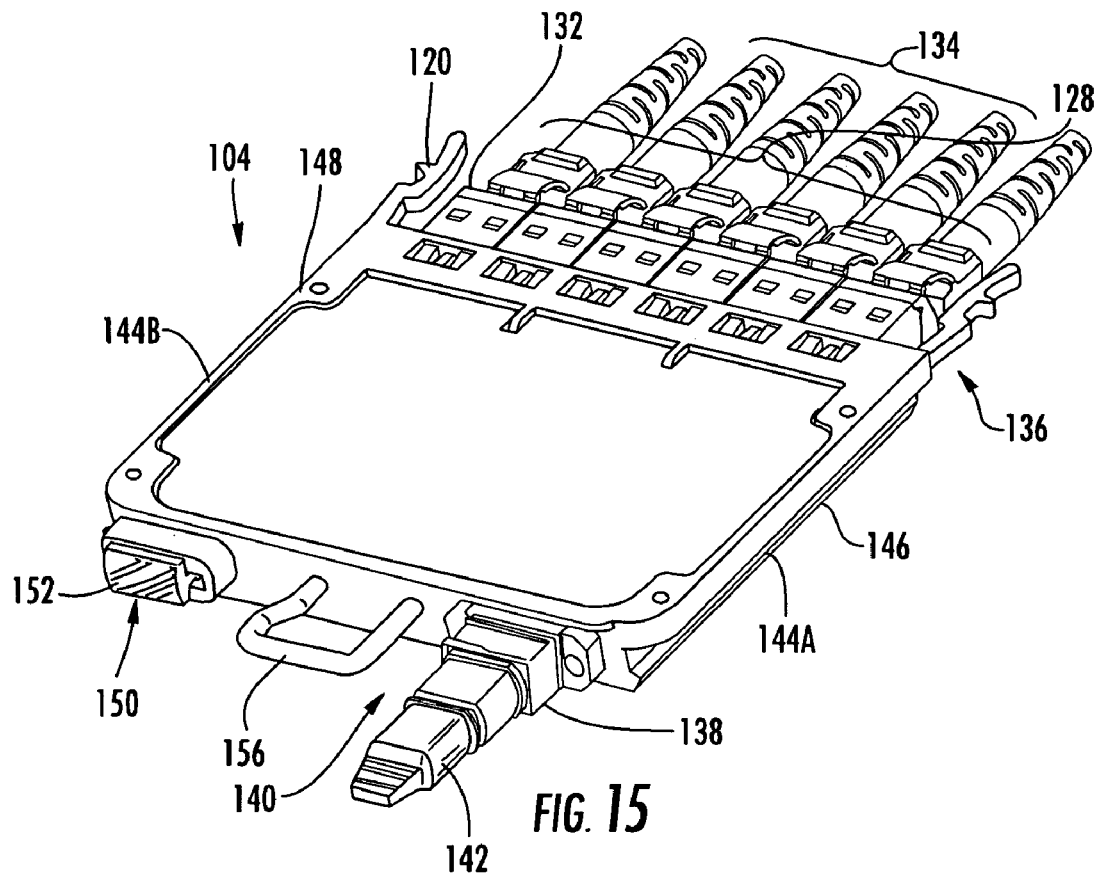
FIG. 15 is a rear perspective view of the fiber optic module in FIG. 14.

As illustrated in FIG. 12, the fiber optic equipment tray 108 contains a series of elongated sections 124. The elongated sections 124 are configured to be inserted into the tray guides 122 disposed inside the module rail guides 106 along the longitudinal axis of the channels 118. Thus, as illustrated in FIGS. 13 and 14, when the fiber optic module 104 is pulled all the way forward along the module rail guide 106 to a front portion 126 of the fiber optic equipment tray 108, a locking feature in the form of a front module latch 128 interlocks with a detent feature 130 disposed adjacent the front end 112 of the chassis 102. The detent feature 130 is secured to the fiber optic equipment tray 108. In this manner, the fiber optic module 104 becomes interlocked with the fiber optic equipment tray 108 such that when the fiber optic equipment tray 108 is translated forward on the first end 114 of the chassis 102, the fiber optic module 104 travels forward with the fiber optic equipment tray 108. The elongated sections 124 and the fiber optic modules 104 interlocked with the fiber optic equipment tray 108 translate together about the tray guides 122 even though the fiber optic module 104 is still supported by the module rail guides 106. FIG. 15 illustrates the fiber optic module 104 and more detail regarding the front module latch 128 in particular.

As illustrated in FIG. 15, the fiber optic module 104 is comprised of a plurality of fiber optic adapters 132 configured to support fiber optic connectors 134 on a front end 136 of the fiber optic module 104. A fiber optic adapter 138 is disposed on a rear end 140 of the fiber optic module 104. In this example of the fiber optic module 104 of FIG. 15, the fiber optic adapters 132 are duplex LC fiber optic adapters, and the fiber optic adapter 138 disposed in the rear end 140 of the fiber optic module 104 is an MTP fiber optic adapter, although any fiber connection type is possible. Fiber optic connections are established between the fiber optic connectors 134 and an MTP fiber optic connector 142 connected to the MTP fiber optic adapter 138. Optical fibers establishing connections between the fiber optic adapters 132, 138 are provided inside the fiber optic module 104.

The fiber optic module 104 also contains two (2) module rails 144A, 144B on a first side 146 and a second side 148, respectively, of the fiber optic module 104. The module rails 144A, 144B are configured to be inserted into the channels 118 of the module rail guides 106 such that the fiber optic module 104 can be translated within the module rail guides 106. In this regard, because the channels 118 in the module rail guides 106 are open in the rear section 110, as illustrated in FIG. 11, the fiber optic modules 104 are rear-installable into the fiber optic equipment 100. The fiber optic module 104 can then be translated forward within the channels 118 until the front module latch 128 reaches the detent feature 130. The front module latch 128 is biased inward such that when it reaches the detent feature 130, the front module latch 128 flexes inward and is retained in the detent feature 130. Once the front module latch 128 is retained in the detent feature 130, the fiber optic module 104 cannot be pulled back towards the rear section 110 or towards the front end 112 independent of the fiber optic equipment tray 108 unless the front module latch 128 is released from the detent features 130. In this manner, the front module latch 128 releasably retains the fiber optic module 104.

Figures 16A, 16B:
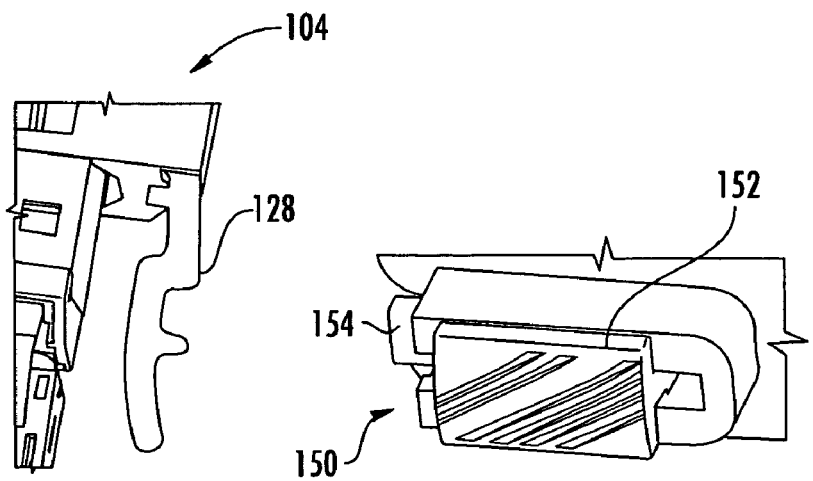
FIG. 16A is a perspective close-up view of a front locking latch in the fiber optic module of FIG. 15.
FIG. 16B is a perspective close-up view of a rear lock in the fiber optic module of FIG. 15.

FIG. 16A illustrates the front module latch 128 for the fiber optic module 104 in more detail. FIG. 16B illustrates a locking feature in the form of a rear module lock 150 that may be provided in the rear end 140 of the fiber optic module 104 to lock the fiber optic module 104 within the module rail guides 106. In this manner, the fiber optic module 104 cannot be removed towards the rear section 110 of the fiber optic equipment 100 unless the rear module lock 150 is unlocked by pushing a rear module lock button 152 to the right as illustrated. When the rear module lock button 152 is moved to the right as illustrated, a latch 154 is disengaged from the channel 118 of the module rail guide 106 such that the fiber optic module 104 can be removed from the rear section 110. The fiber optic module 104 may be removed from the rear section 110 by pulling on a pulling loop 156 (as shown in FIG. 15) attached to the rear end 140 of the fiber optic module 104.

Figure 17:
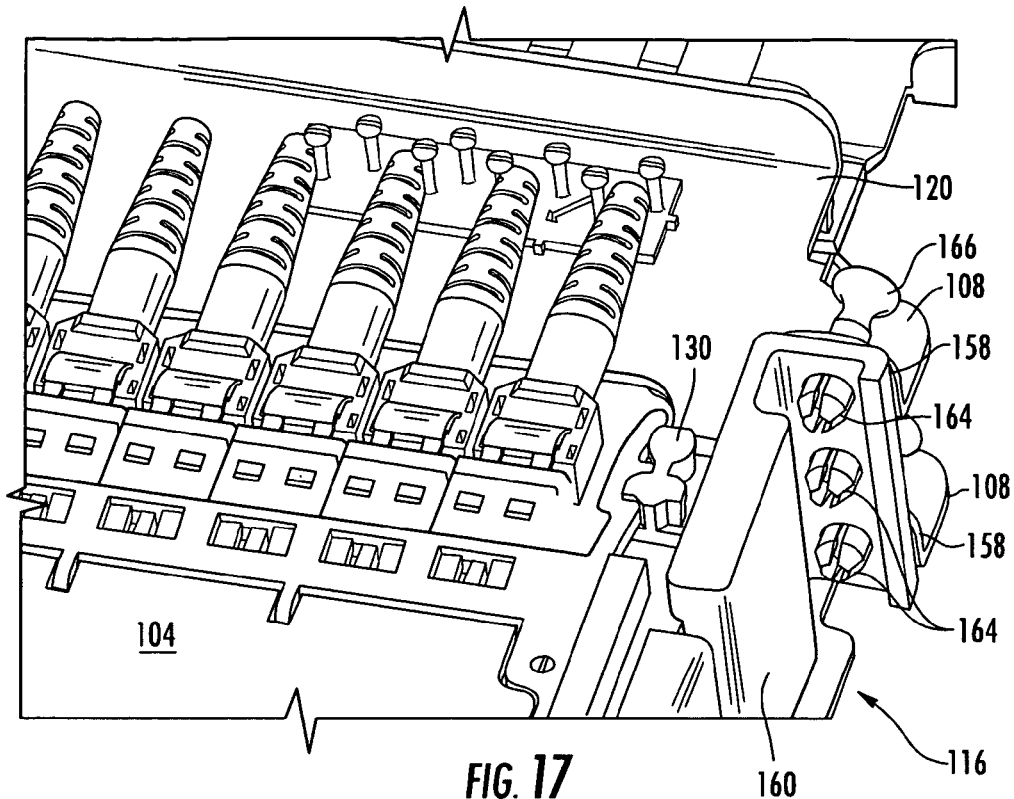
FIG. 17 is a rear perspective close-up view of the rear-installable fiber optic modules installed in module guides.
Figure 18:
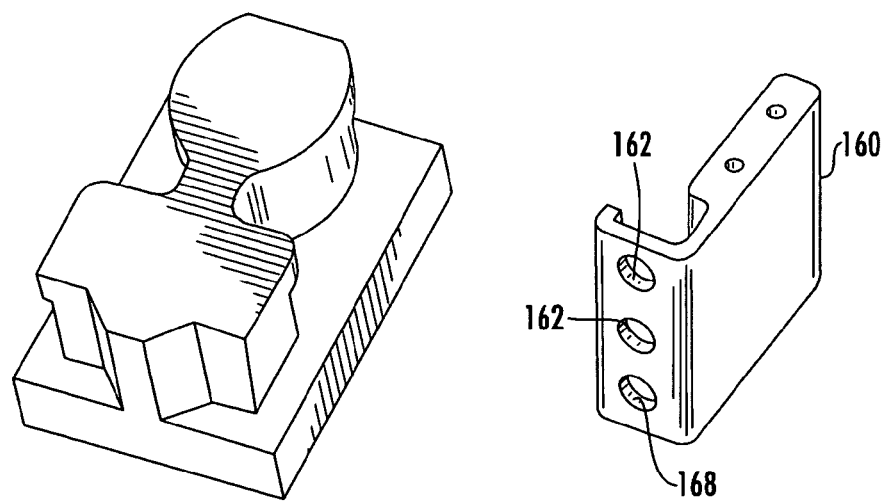
FIG. 18 is a perspective view of the locking features to lock fiber optic modules to fiber optic equipment tray and the fiber optic equipment trays to the chassis of the fiber optic equipment of FIG. 10.

FIGS. 17 and 18 illustrate the detent feature 130 and how the fiber optic equipment trays 108 are interlocked into the chassis 102. As illustrated therein, the fiber optic equipment tray 108 contains an upwardly extending tab 158 that is secured to a bracket 160 wherein the bracket 160 is attached to the chassis 102. The bracket 160 contains a series of apertures 162 that are adapted to receive flanges 164 from plungers 166. Each fiber optic equipment tray 108 contains a plunger 166 disposed through the upwardly extending tab 158 that is adapted to engage with the aperture 162. When it is desired to lock the fiber optic equipment tray 108 to the chassis 102, the plunger 166 is engaged in the aperture 162. As illustrated in FIGS. 17 and 18, three (3) apertures 162 are provided in the bracket 160 because three (3) fiber optic equipment trays 108 are provided. Each aperture 162 is designed to retain the upwardly extending tab 158 from a particular fiber optic equipment tray 108. FIG. 17 illustrates the bracket 160 disposed on the second end 116 of the chassis 102. Although not shown, the bracket 160 is also disposed on the first end 114 of the chassis 102 as illustrated in FIG. 10. When it is desired to release the fiber optic equipment tray 108 from the chassis 102, such as to pull it forward for access, the plunger 166 is pulled and disengaged from the corresponding aperture 162 in the bracket 160. In this manner, each fiber optic equipment tray 108 is free to independently translate outwardly towards the front end 112 wherein the elongated sections 124 are moved forward about the tray guides 122 within the module rail guides 106.

Figure 19:
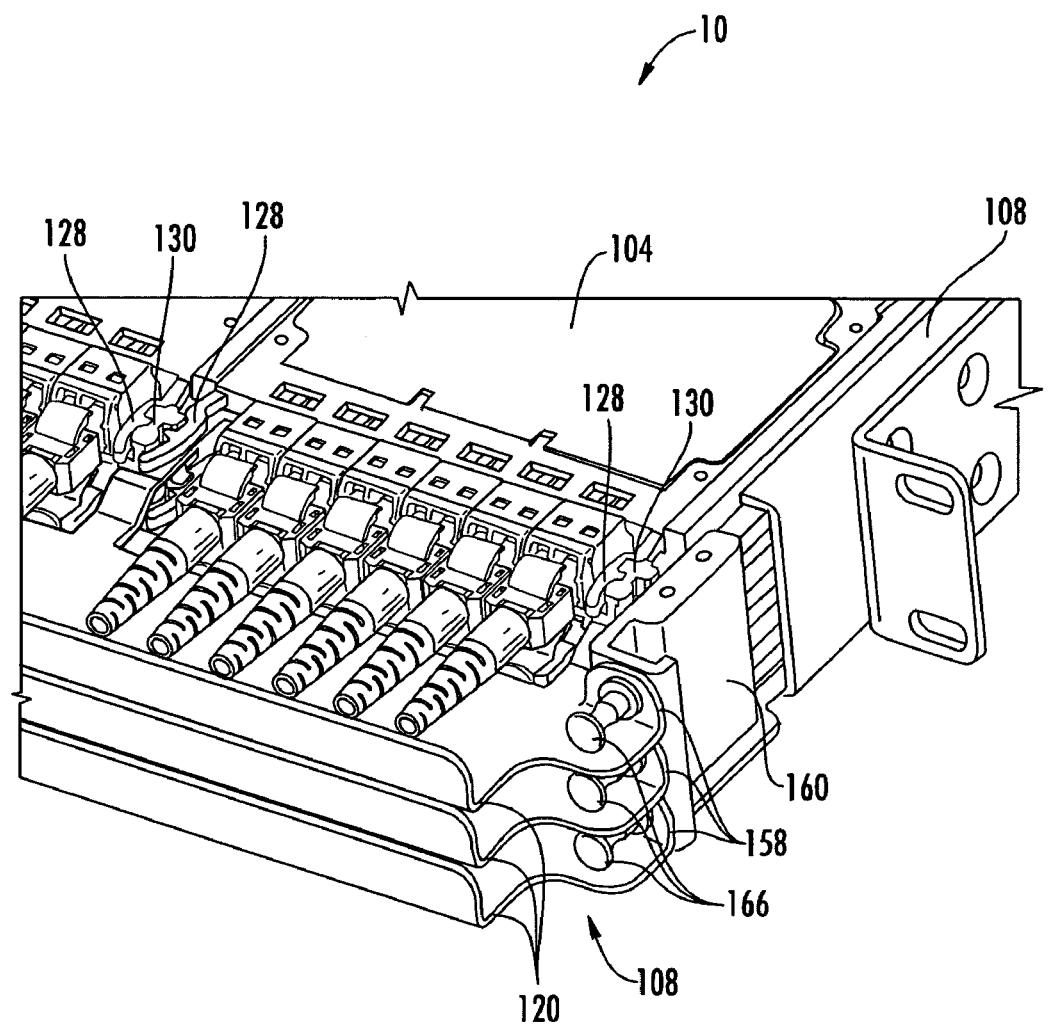
FIG. 19 is a front perspective view of the fiber optic equipment of FIG. 10 with rear-installable fiber optic modules disposed in the module guides.
Figure 20:
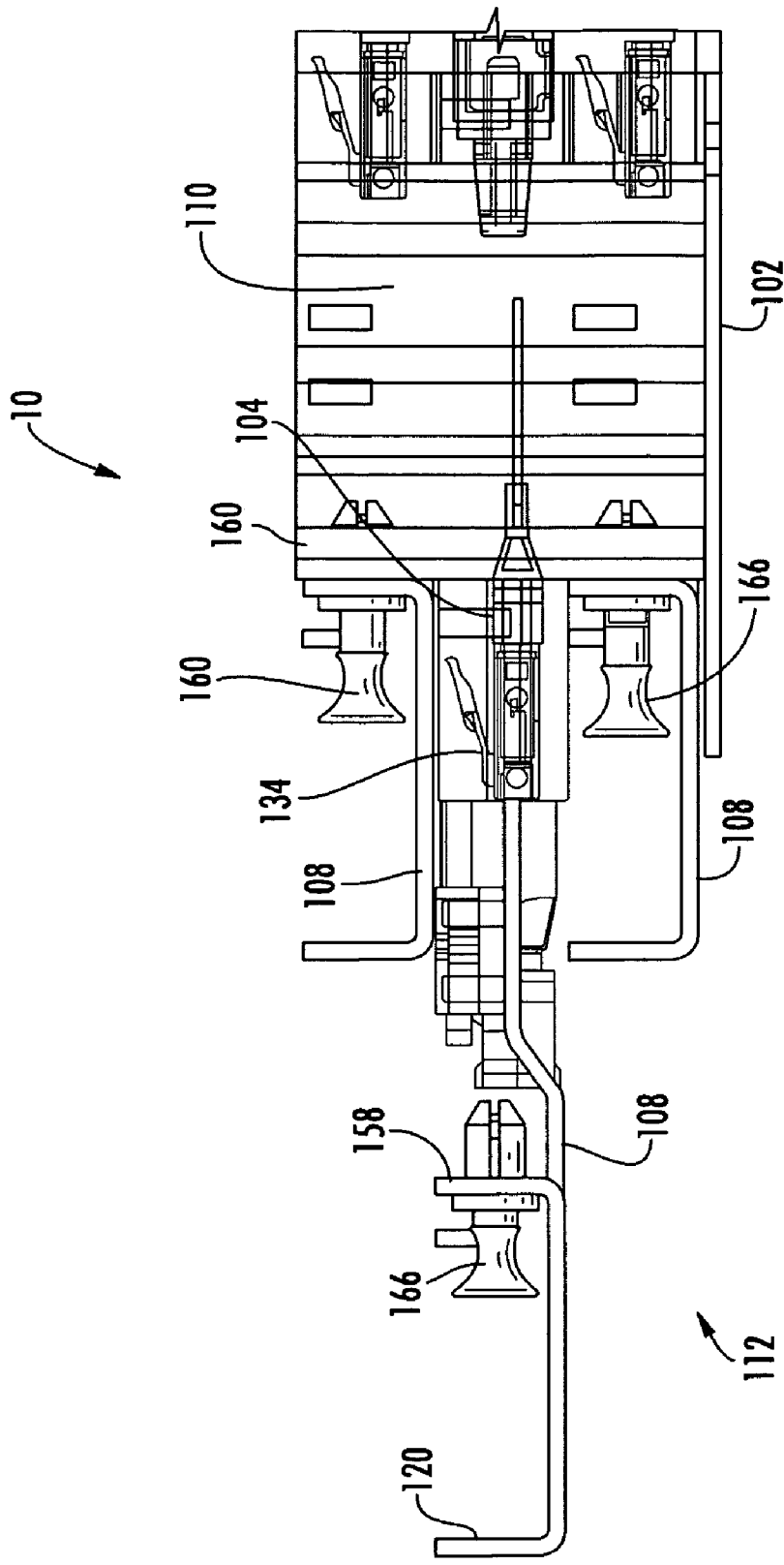
FIG. 20 is a side cross-sectional view of the fiber optic equipment of FIG. 10 with rear-installable fiber optic modules disposed in the module guides and interlocked with the fiber optic equipment trays, with one fiber optic equipment tray extended forward.
Figure 21:
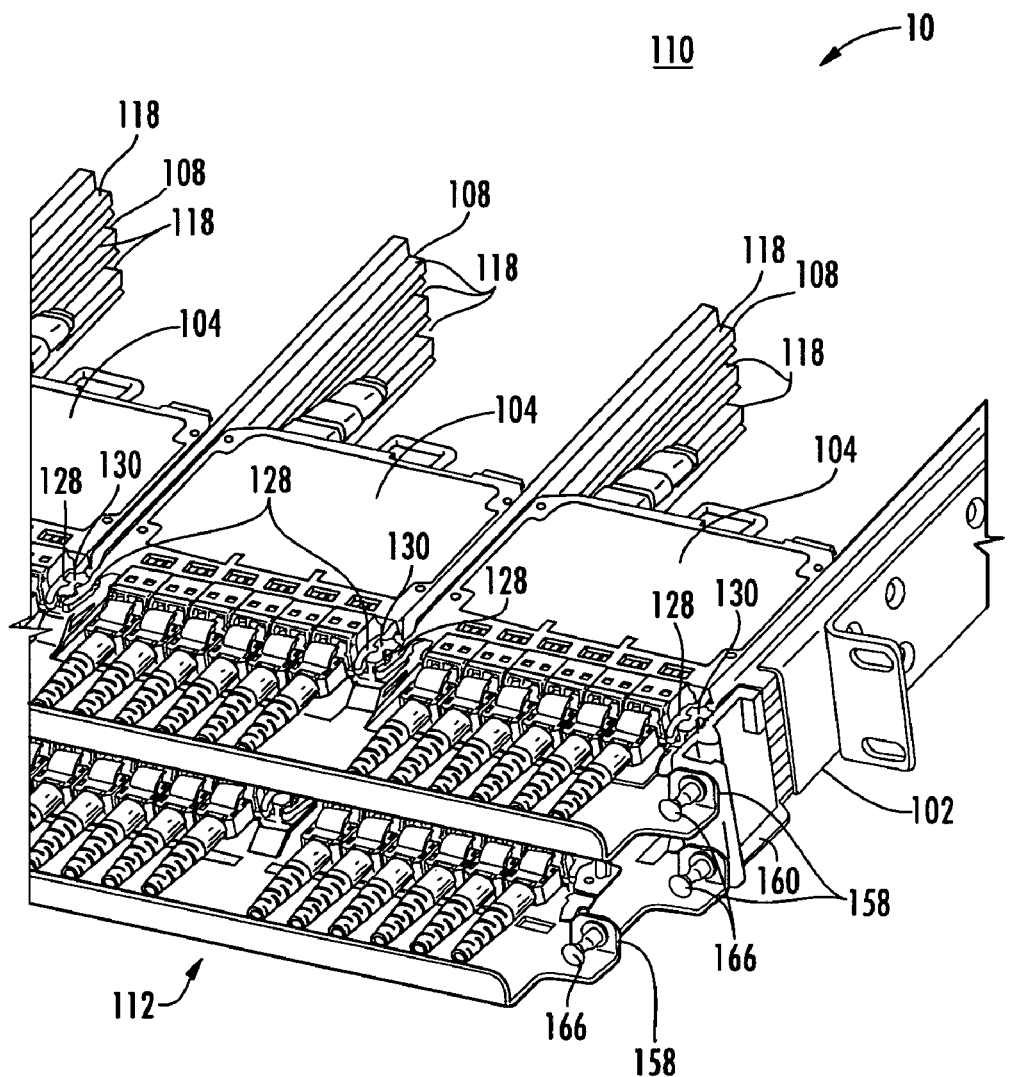
FIG. 21 is a front perspective view of the fiber optic equipment of FIG. 20.

FIG. 19 illustrates a front perspective view of the fiber optic equipment 100 and the fiber optic modules 104 locked into the fiber optic equipment trays 108 via the front module latch 128 engaging with the detent feature 130. As illustrated therein, each of the fiber optic equipment trays 108 are secured to the chassis 102 via their plungers 166 being engaged with the bracket 160. In order to disengage the fiber optic equipment tray 108 from the chassis 102, the plunger 166 is pulled to disengage the plunger 166 from the aperture 162 in the bracket 160. In this manner, the pulling force applied towards the front end 112 will translate the fiber optic equipment tray 108 forward. This is illustrated in FIGS. 20 and 21. FIG. 20 is a side cross-sectional view of the fiber optic equipment 100 shown in perspective view in FIG. 21 with a middle fiber optic equipment tray 108 extended. As illustrated therein, the middle fiber optic equipment tray 108 is extended from the chassis 102. The plunger 166 for the middle fiber optic equipment tray 108 is disengaged from the bracket 160 and the aperture 162 therein.

Figure 22:
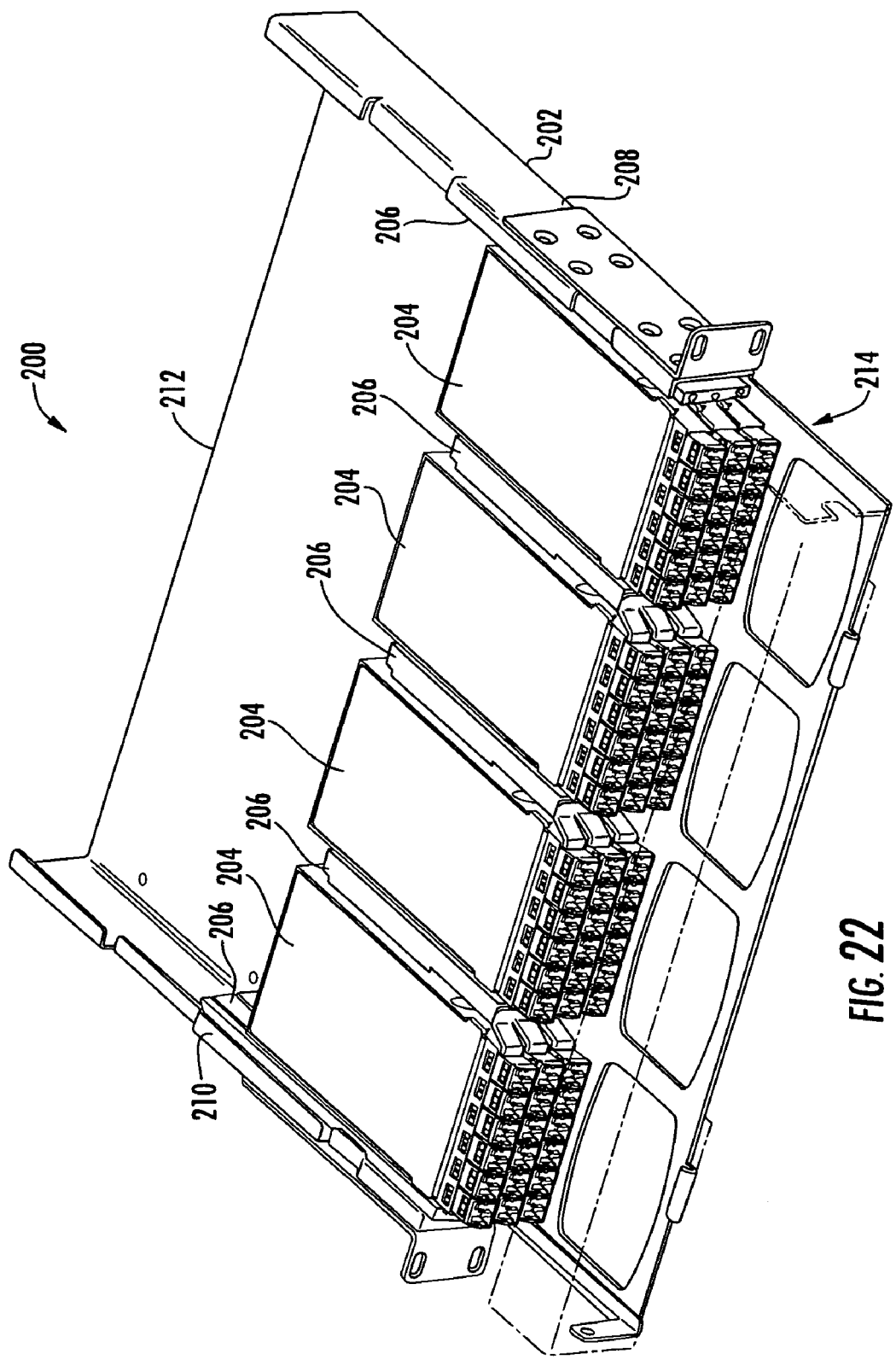
FIG. 22 is a front perspective view of another exemplary fiber optic equipment supporting rear-installable fiber optic modules.

FIG. 22 illustrates yet another example of fiber optic equipment 200 that also provides for rear-installable fiber optic modules. Like the fiber optic equipment 100 in FIGS. 10-21, each fiber optic module supported in the fiber optic equipment 200 of FIG. 22 is supported in module rails disposed in the chassis. The fiber optic modules are also independently translatable within the module rails.

As illustrated in FIG. 22, the fiber optic equipment 200 is provided, which includes a chassis 202 configured to hold one or more fiber optic modules 204. The fiber optic modules 204 are supported on a guide system in the form of module rail guides 206 that are disposed within and attached to the chassis 202 similar to the fiber optic equipment 100 in FIGS. 10-21. The module rail guides 206 are attached to the chassis 202. Only two module rail guides 206 are required to be provided on a first end 208 of the chassis 202 and a second end 210 of the chassis 202 such that a fiber optic module 204 can be installed in a rear section 212 of the chassis 202 and moved along the module rail guides 206 to a front end 214 of the chassis 202.

As will be described in further detail in this application, the module rail guides 206 contain one or more channels 216 (shown in FIGS. 24A and 24B) that are adapted to receive rails (element 215 in FIG. 25) disposed on each side of the fiber optic modules 204. The channels 216 are open in the rear section 212 such that the rails of the fiber optic module 204 can be inserted into the module rail guides 206 in the rear section 212 of the chassis 202 and moved forward within the module rail guides 206 until the fiber optic module 204 reaches the front end 214 of the chassis 202. This is further illustrated in FIG. 23. As illustrated therein, a fiber optic module 204 is shown as being inserted partially into the module rail guides 206. Module rails 215A, 215B are disposed on each side of the fiber optic module 204 such that the module rails 215A, 215B mate with the channels 216 in the module rail guides 206 so that the fiber optic module 204 may be slid from the rear section 212 to the front end 214 of the chassis 202.

Figure 23:
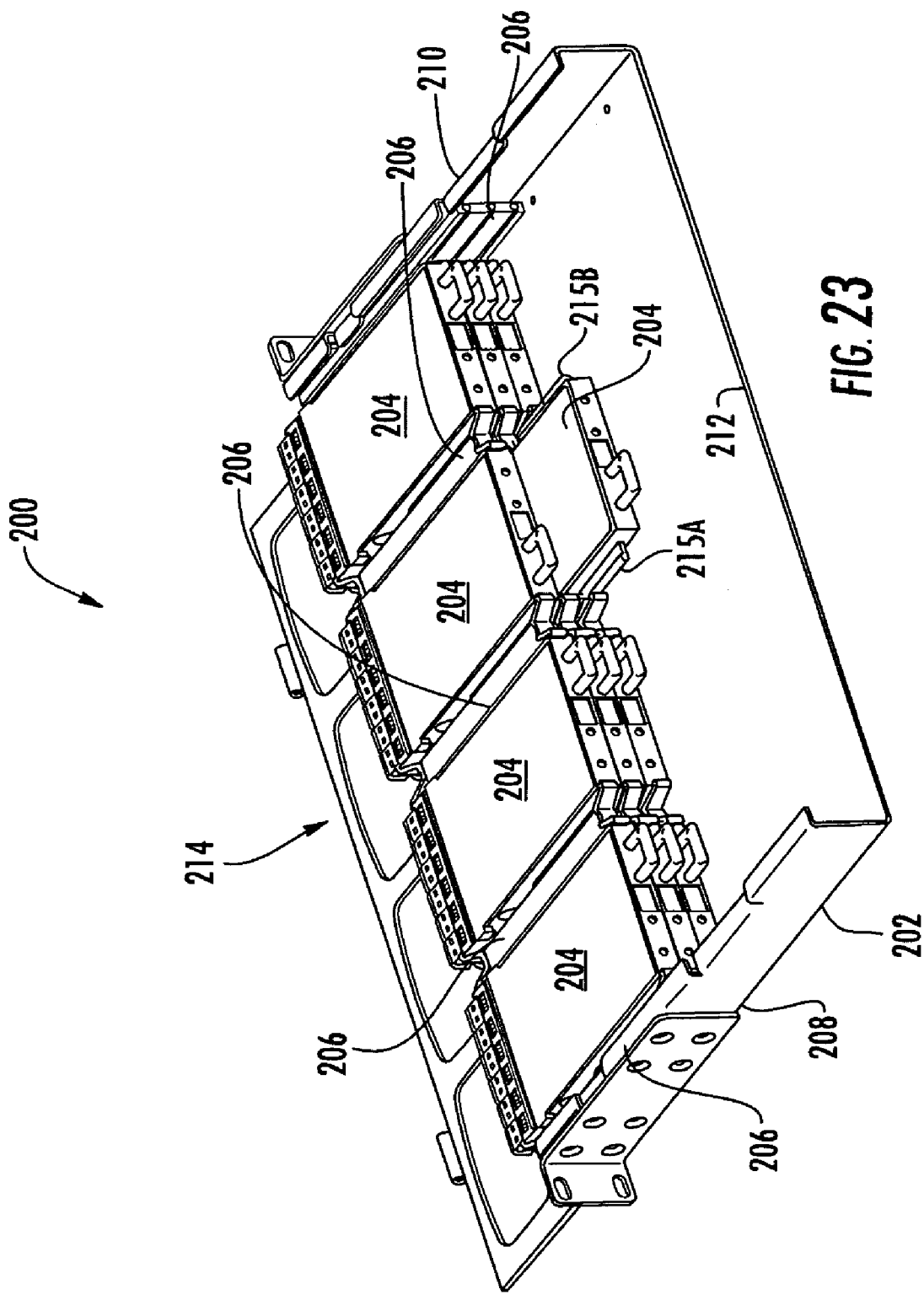
FIG. 23 is a rear perspective view of the fiber optic equipment supporting the rear-installable fiber optic modules of FIG. 22.
Figures 24A, 24B:
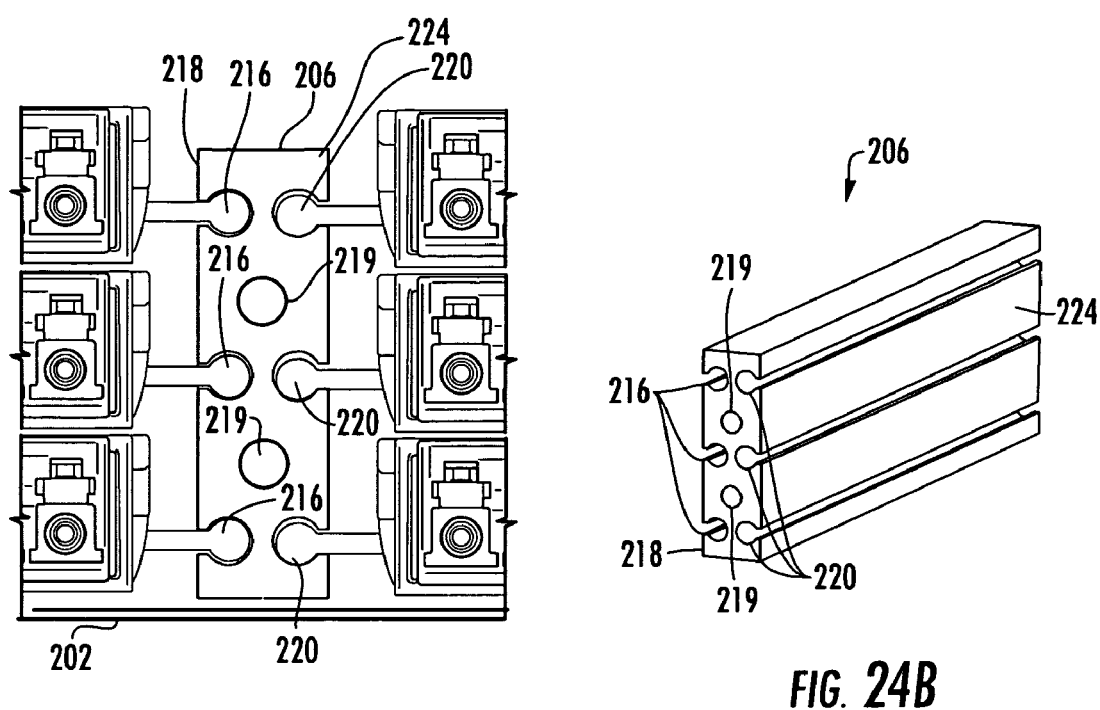
FIG. 24A is a front view of a module guide supporting rear-installable fiber optic modules in the fiber optic equipment of FIG. 22.
FIG. 24B is a perspective view of the module guide illustrated in FIG. 24A.

FIGS. 24A and 24B illustrate more detail regarding the module rail guides 206 that are disposed in the fiber optic equipment 200 of FIGS. 22 and 23. As illustrated therein, a module rail guide 206 is disclosed that is provided between the first end 208 and the second end 210. For this type of module rail guide 206, the channels 216 are disposed on a first side 218 of the module rail guides 206. Channels 220 are also provided on a second side 224 of the module rail guides 206. In this manner, the module rail guide 206 can support rails of fiber optic modules 204 on each side. The module rail guide 206 illustrated in FIG. 24A would be provided as an intermediate module rail guide if more than one fiber optic module 204 in a given plane is supported by the fiber optic equipment 200. In this case, at least one intermediate module rail guide 206 is provided with channels 216, 220 disposed on each side 218, 224. As illustrated in FIG. 24A, the module rail guide 206 is attached to the chassis 202 such that when the module rails 215A, 215B of the fiber optic modules 204 are disposed within the channels 216, 220, the fiber optic modules 204 are supported by the chassis 202. Also, as will be described in greater detail below with regard to FIGS. 26A and 26B, the module rail guides 206 also contain a series of internal apertures 219 that support attaching module locks or stops to the chassis 202. The module locks or stops prevent the fiber optic modules 204 from translating beyond the front end 214 of the chassis 202.

Figure 25:
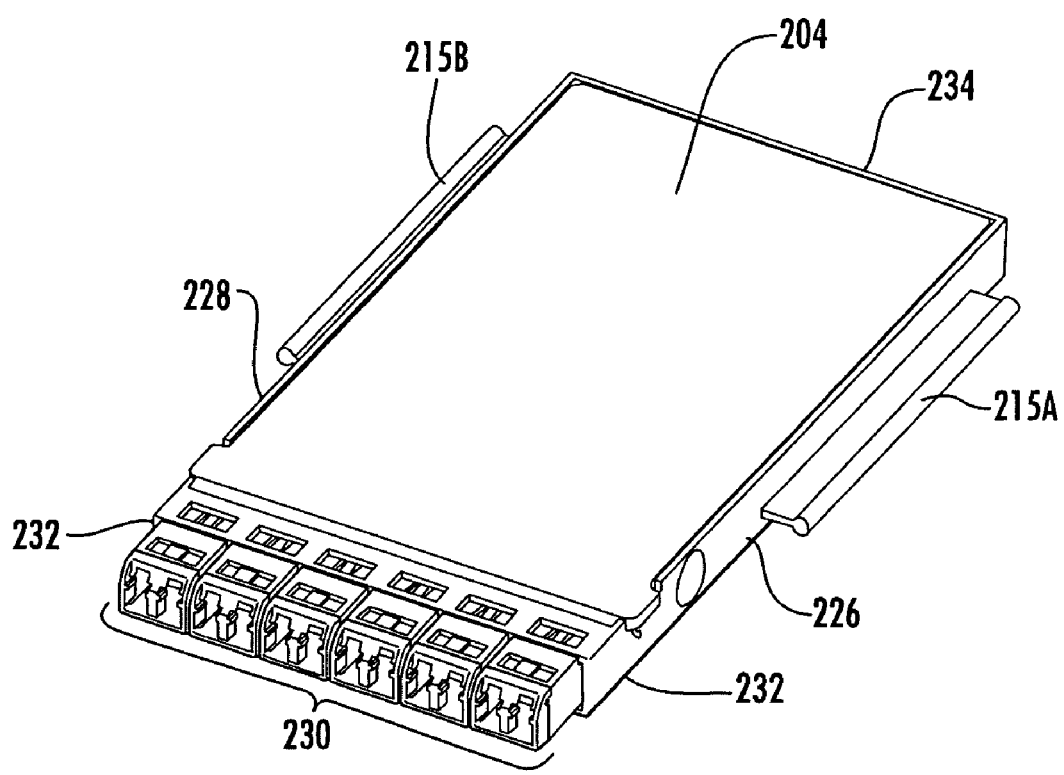
FIG. 25 is a front perspective view of the fiber optic modules disposed in the module guides provided in the fiber optic equipment of FIG. 22.

FIG. 25 illustrates the rear-installable fiber optic module 204 that is adapted to be supported by the module rail guides 206 of the fiber optic equipment 200. As illustrated therein, module rails 215A, 215B are disposed on sides 226, 228, respectively, of the fiber optic module 204. These module rails 215A, 215B can be inserted into the module rail guides 206 to insert the fiber optic module 204 into the fiber optic equipment 200. Because the channels 220 in the module rail guides 206 are open in the rear section 212 of the chassis 202, the fiber optic modules 204 are rear-installable, meaning they can be installed from the rear section 212 of the chassis 202. The fiber optic module 204 contains a series of fiber optic adapters 230 disposed on a front end 232 of the fiber optic module 204. One or more fiber optic adapters 230 optically connected to the fiber optic adapters 230 are disposed on a rear end 234 of the fiber optic module 204. In this manner, connectorized fiber optic cables (not shown) connected to the fiber optic adapters 230 establish a fiber optic connection with fiber optic cables (not shown) installed in the fiber optic adapters 230 in the rear end 234 of the fiber optic module 204.

Figure 26A:
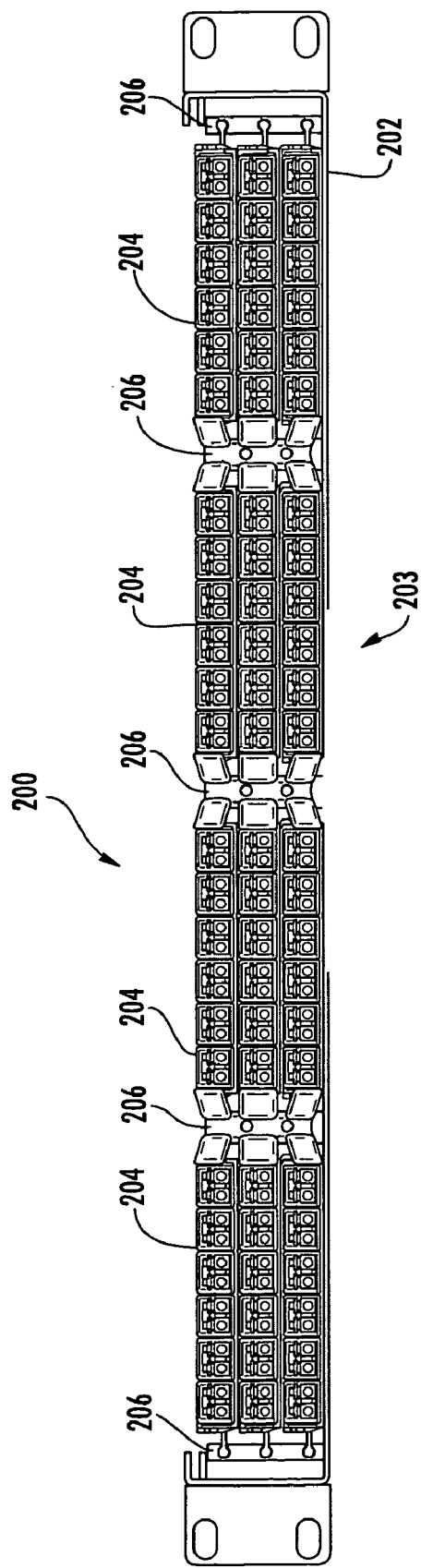
FIGS. 26A and 26B are a front view of the fiber optic equipment of FIG. 22 with fiber optic modules installed in all module guides and a locking feature to prevent the fiber optic modules from being pulled forward beyond a front end of the fiber optic equipment.
Figure 26B:
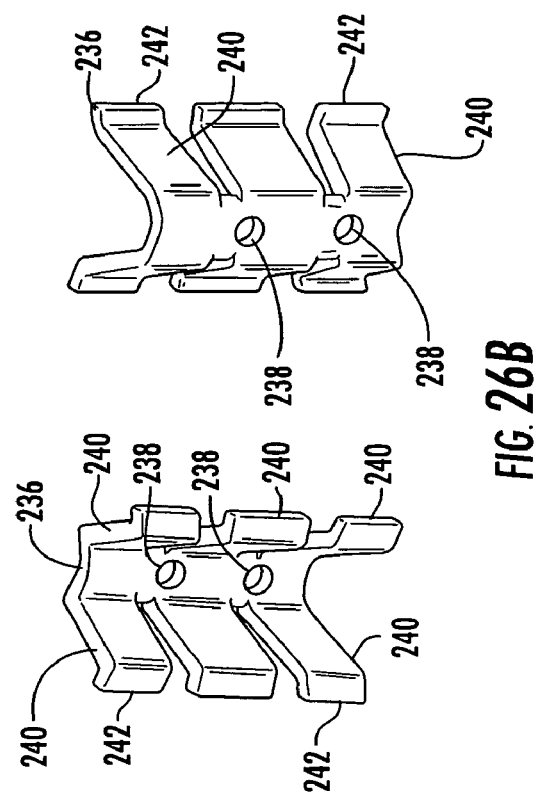

FIG. 26A illustrates a front view of the fiber optic equipment 200 with fiber optic modules 204 installed in the module rail guides 206 as previously described. To prevent the fiber optic modules 204 from extending beyond the first end 208 of the chassis 202, stop or lock features 236 are disposed between the rows of fiber optic modules 204 on the intermediate module rail guides 206. FIG. 26B illustrates the stop or lock features 236 in more detail wherein front and rear perspective views are illustrated. The stop or lock features 236 contain a series of apertures 238 that align with the apertures 219 disposed in the module rail guides 206 as illustrated previously in FIG. 24B. A fastener (not shown) can be inserted into the apertures 238 to fasten the stop or lock features 236 to the module rail guides 206. The stop features 236 contain opposing flared portions 240 on each side of the stop or lock feature 236 which contain platforms 242 of which the front end 232 of the fiber optic modules 204 abut against to prevent the fiber optic modules 204 from extending forward from the first end 208 of the chassis 202.

Figure 27:
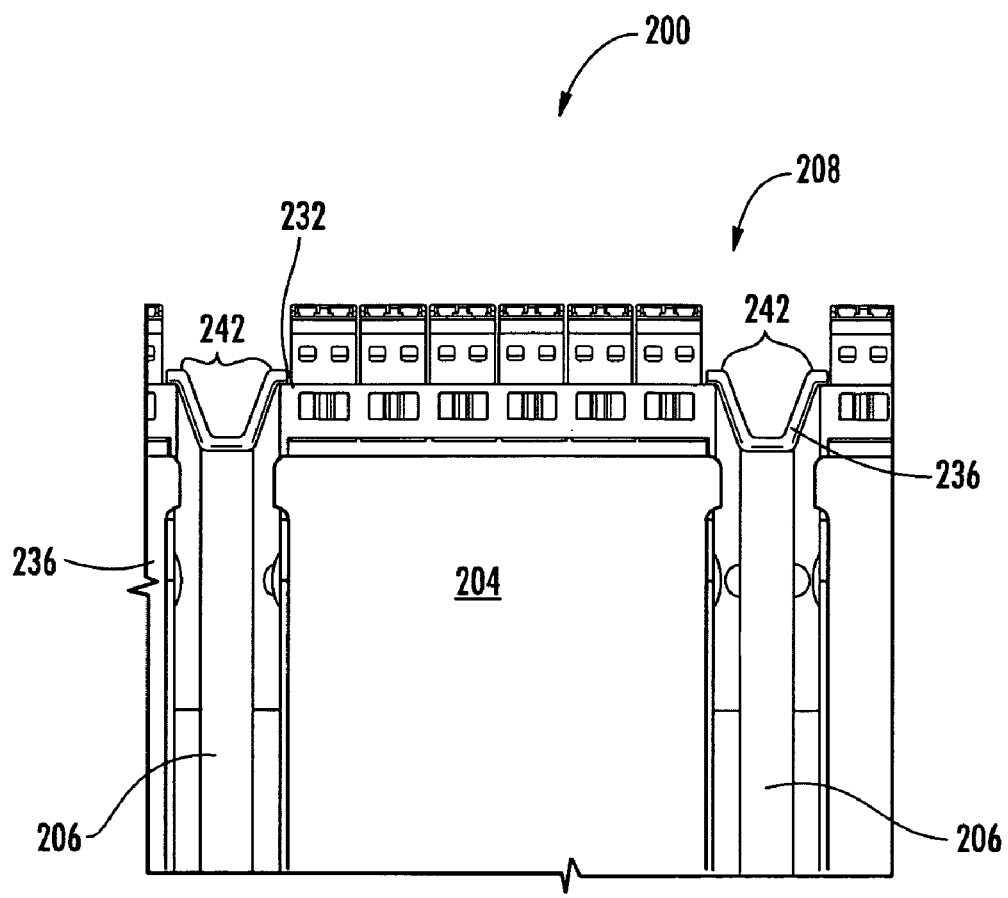
FIG. 27 is a top view of a fiber optic module supported by module guides disposed in the fiber optic equipment of FIG. 22.

FIG. 27 illustrates a top view of the fiber optic equipment 200 with the fiber optic module 204 installed therein between two module rail guides 206. As illustrated therein, the fiber optic module 204 is extended forward to the front end 214 of the chassis 202 wherein the front end 232 of the fiber optic module 204 abut against the platforms 242 in the stop or lock features 236 to prevent the fiber optic modules 204 from being extended beyond the front end 214 of the fiber optic equipment 200.

Figure 28:
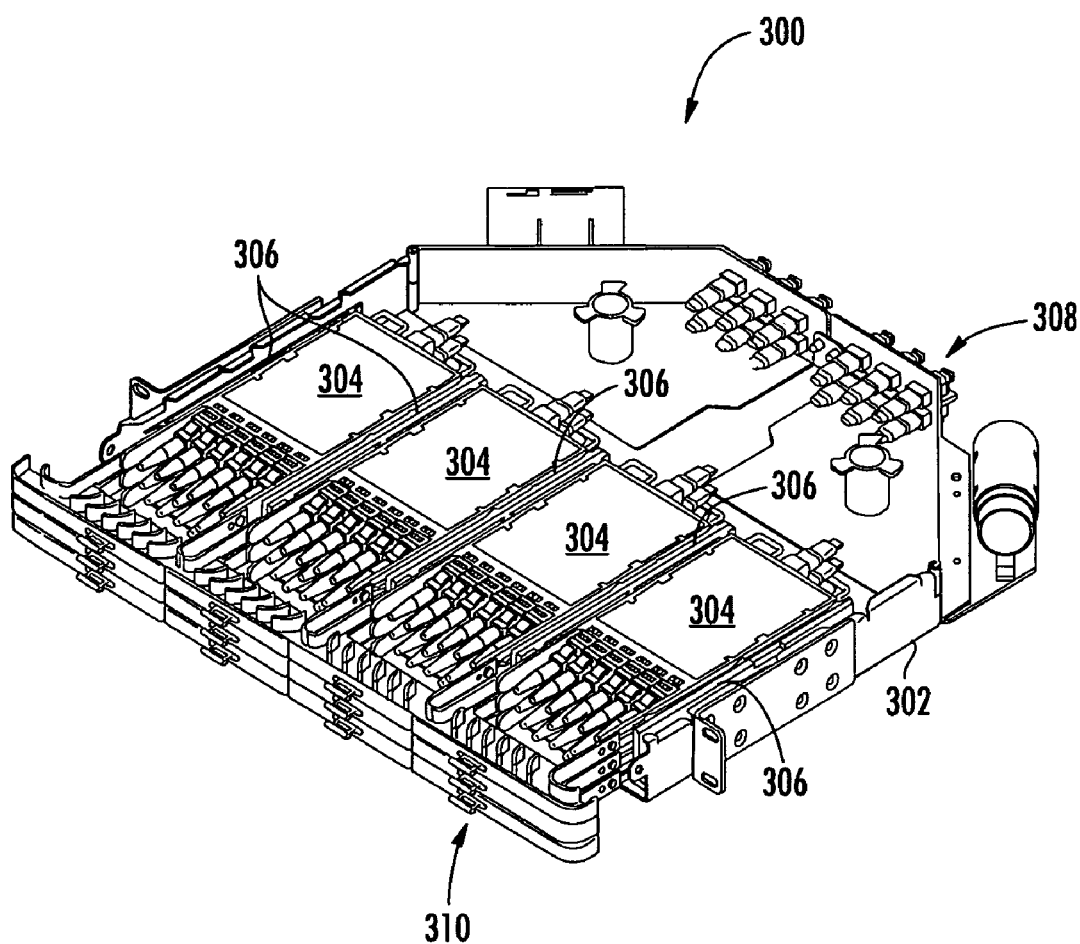
FIG. 28 is a front perspective view of another exemplary fiber optic equipment supporting rear-installable fiber optic modules.

FIG. 28 illustrates yet another embodiment of fiber optic equipment that is configured to allow and support rear-installable fiber optic modules. As illustrated in FIG. 28, the fiber optic equipment 300 contains a chassis 302 that supports one or more fiber optic modules 304. The fiber optic modules 304 are supported by a guide system in the form of module rail guides 306 that are attached to the chassis 302 such that each of the fiber optic modules 304 can translate about the module rail guides 306. More specifically, the fiber optic modules 304 can be rear-installable from a rear section 308 of the chassis 302 into the module rail guides 306 and extended forward within the module rail guides 306 to a front end 310 of the chassis 302.

Figure 29:
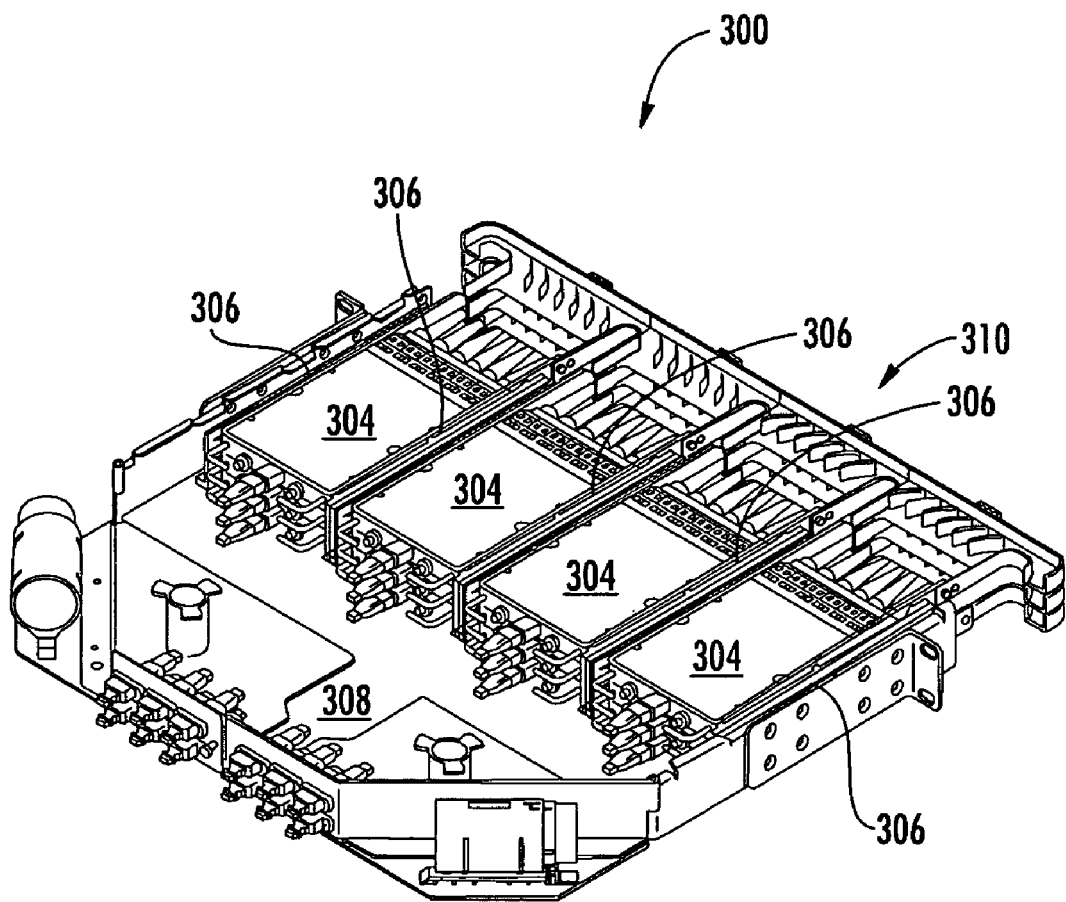
FIG. 29 is a rear perspective view of the fiber optic equipment supporting the rear-installable fiber optic modules of FIG. 28.

FIG. 29 illustrates a rear perspective view of the fiber optic equipment 300 illustrated in FIG. 28 showing a series of rear-installable fiber optic modules 304 installed therein. It is noted that the module rail guides 306 can be provided that support more than one plane or row of fiber optic modules 304. In such a case, a plurality of channels will be provided in the module rail guides 306 to support more than one row of fiber optic modules 304.

Figure 30:
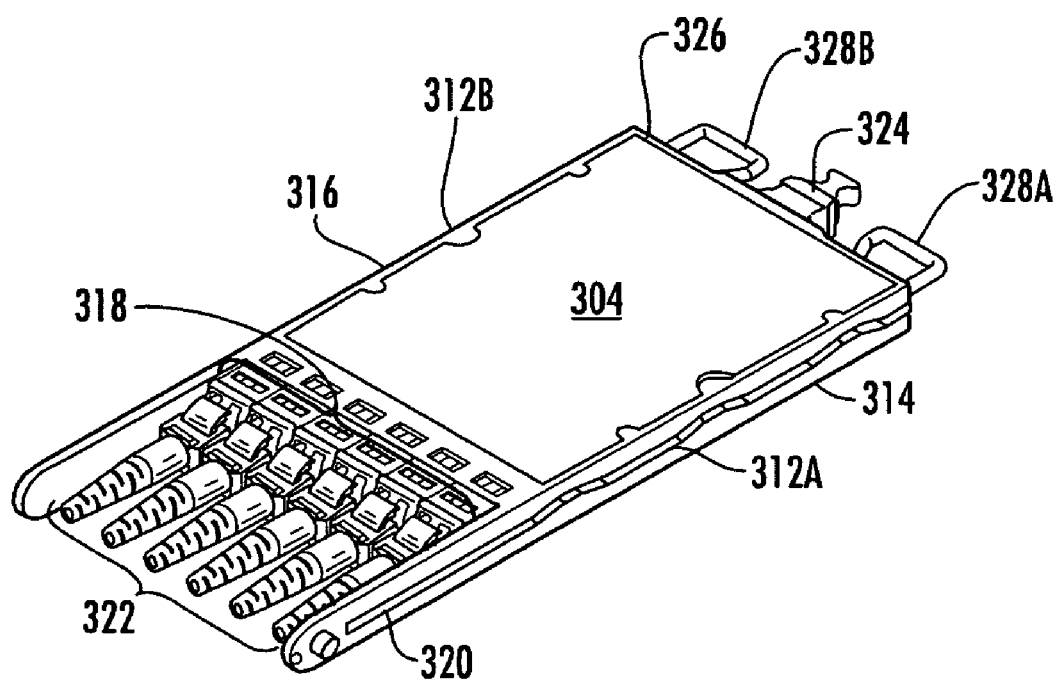
FIG. 30 is a front perspective view of the fiber optic modules provided in the fiber optic equipment of FIG. 22.

FIG. 30 illustrates the fiber optic module 304 illustrated in FIGS. 28 and 29 in more detail. As illustrated therein, the fiber optic module 304 contains module rails 312A, 312B disposed on each side 314, 316 of the fiber optic module 304. The module rails 312A, 312B are adapted to be received into channels of the module rail guides 306 to support the fiber optic modules 304. Each fiber optic module 304 is independently movable about the module rail guides 306. Intermediate fiber optic equipment trays are not provided. The fiber optic module 304 contains a series of fiber optic adapters 318 disposed on a front end 320 of the fiber optic module 304. A series of fiber optic connectors 322 may be connected to the fiber optic adapters 318 to establish fiber optic connections. A fiber optic adapter 324 is disposed in a rear end 326 of the fiber optic module 304 such that a fiber optic connector 322 connected to the fiber optic adapter 324 will establish an optical connection with optical fibers connected to the fiber optic connectors 322. The fiber optic module 304 also contains a series of pulling loops 328A, 328B disposed on each side of the fiber optic adapter 324 that may assist in removing the fiber optic module 304 from the rear section 308 of the fiber optic equipment 300.

Figure 31:
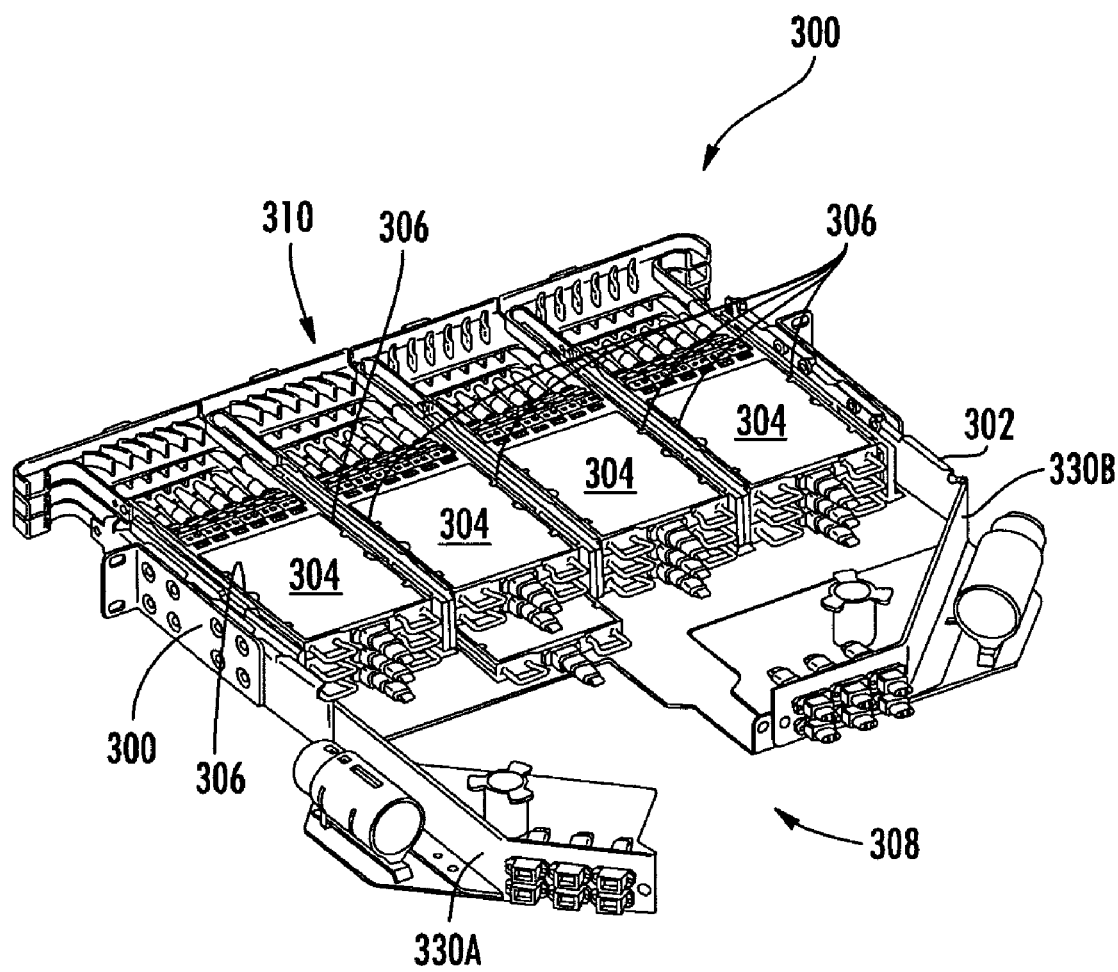
FIG. 31 is another rear perspective view of the fiber optic equipment supporting the rear-installable fiber optic modules of FIG. 28.

In order to install a fiber optic module 304 from the rear section 308 of the fiber optic equipment 300, as illustrated in FIG. 31, hinged portions 330A, 330B of the rear section 308 of the chassis 302 are pulled outward such that the module rail guides 306 are accessible to a technician. Thereafter, the fiber optic module 304 and its module rails 312A, 312B are inserted into channels in the module rail guides 306 as illustrated in FIG. 31. The fiber optic module 304 is then pushed forward within the module rail guides 306 until the fiber optic module 304 reaches the front end 310 of the chassis 302. Once the fiber optic modules 304 are installed as desired, the hinged portions 330A, 330B are closed.

Figure 32:
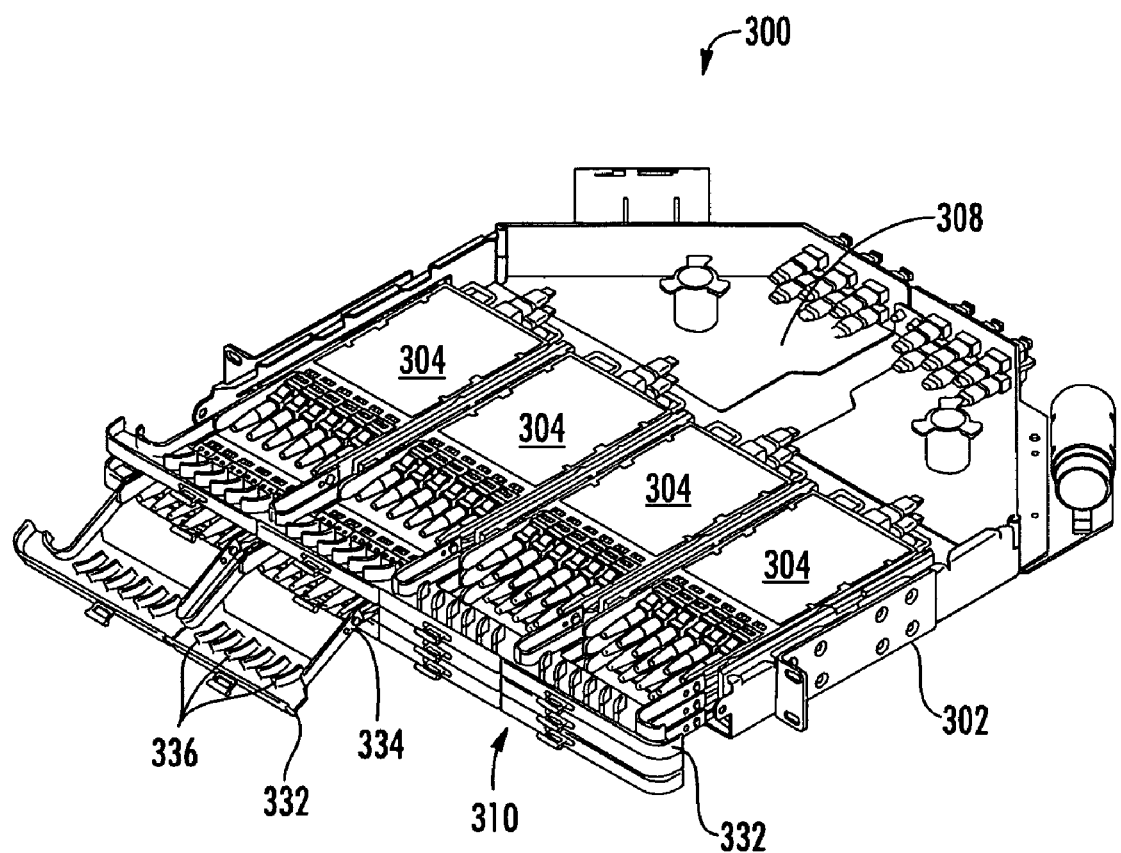
FIG. 32 is another front perspective view of the fiber optic equipment supporting the rear-installable fiber optic modules of FIG. 28 with a fiber routing tray extended and tilted downward to provide access to certain fiber optic modules.
Figure 33:
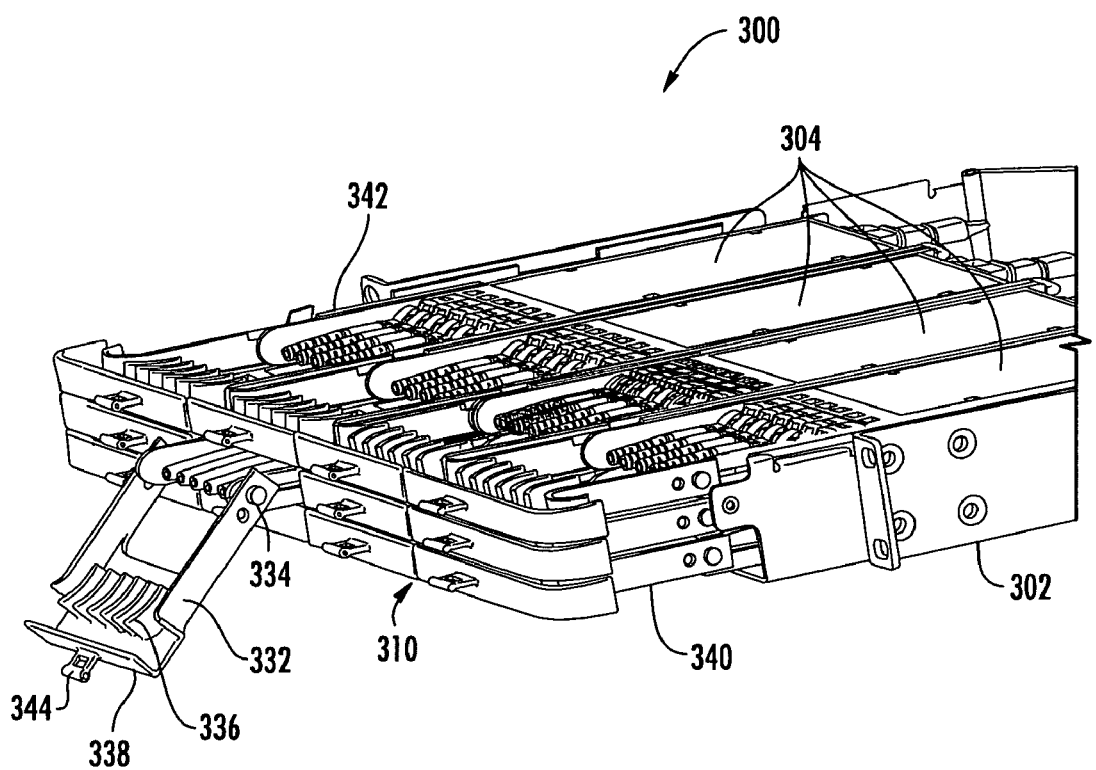
FIG. 33 is another front perspective view of the fiber optic equipment supporting the rear-installable fiber optic modules of FIG. 28 with the fiber routing tray extended and tilted downward.

In order to access the fiber optic connectors 322 of the fiber optic modules 304, a module guide tray 332, which is hingedly attached via hinges to the module rail guides 306, can be pulled forward and tilted downward as illustrated in FIG. 32. Each fiber optic module 304 has its own module guide tray 332 such that each fiber optic module 304 is individually accessible and independently movable about the module rail guides 306. The module guide tray 332 may contain a series of fiber routing guides 336 that support routing of connectorized fiber optic cables (not shown) connected to the fiber optic adapters 318 of the fiber optic module 304. FIG. 33 illustrates a side perspective view illustrating more detail regarding the module guide tray 332. The module guide tray 332 is pulled forward and hingably tilted via hinge 334 downward to access the fiber optic adapters 318 of the fiber optic modules 304. The module guide tray 332 may contain a U-shaped flange 338 to allow optical fibers to be routed therein to either the left or right of the tray to the sides 340, 342 of the chassis 302. Further, a handle 344 may be provided and attached to the module guide tray 332 to allow for pulling and pushing for easy translation of the fiber optic module 304.

Figure 34:
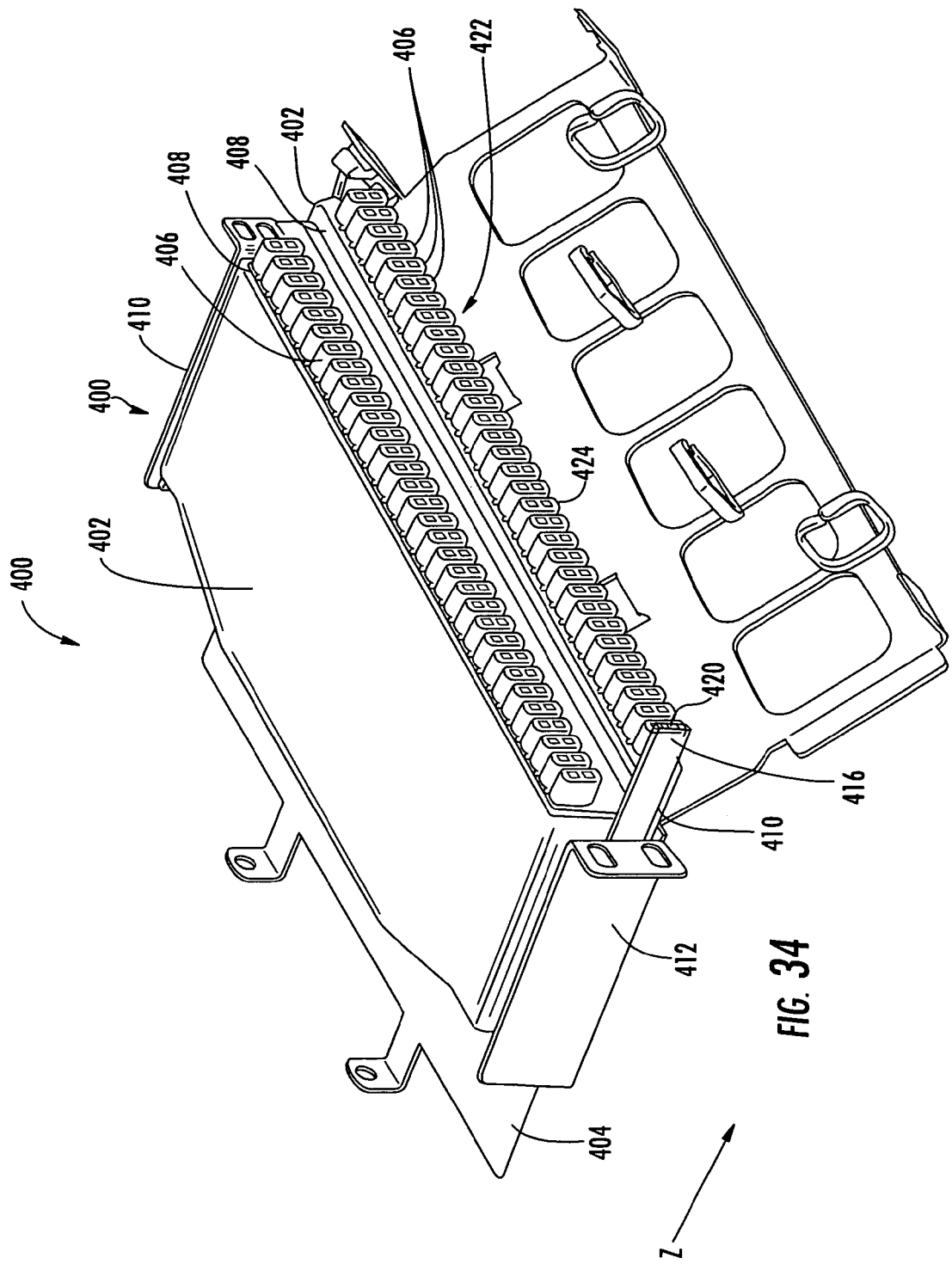
FIG. 34 is a front perspective view of another exemplary fiber optic equipment supporting rear-installable fiber optic modules.
Figure 35:
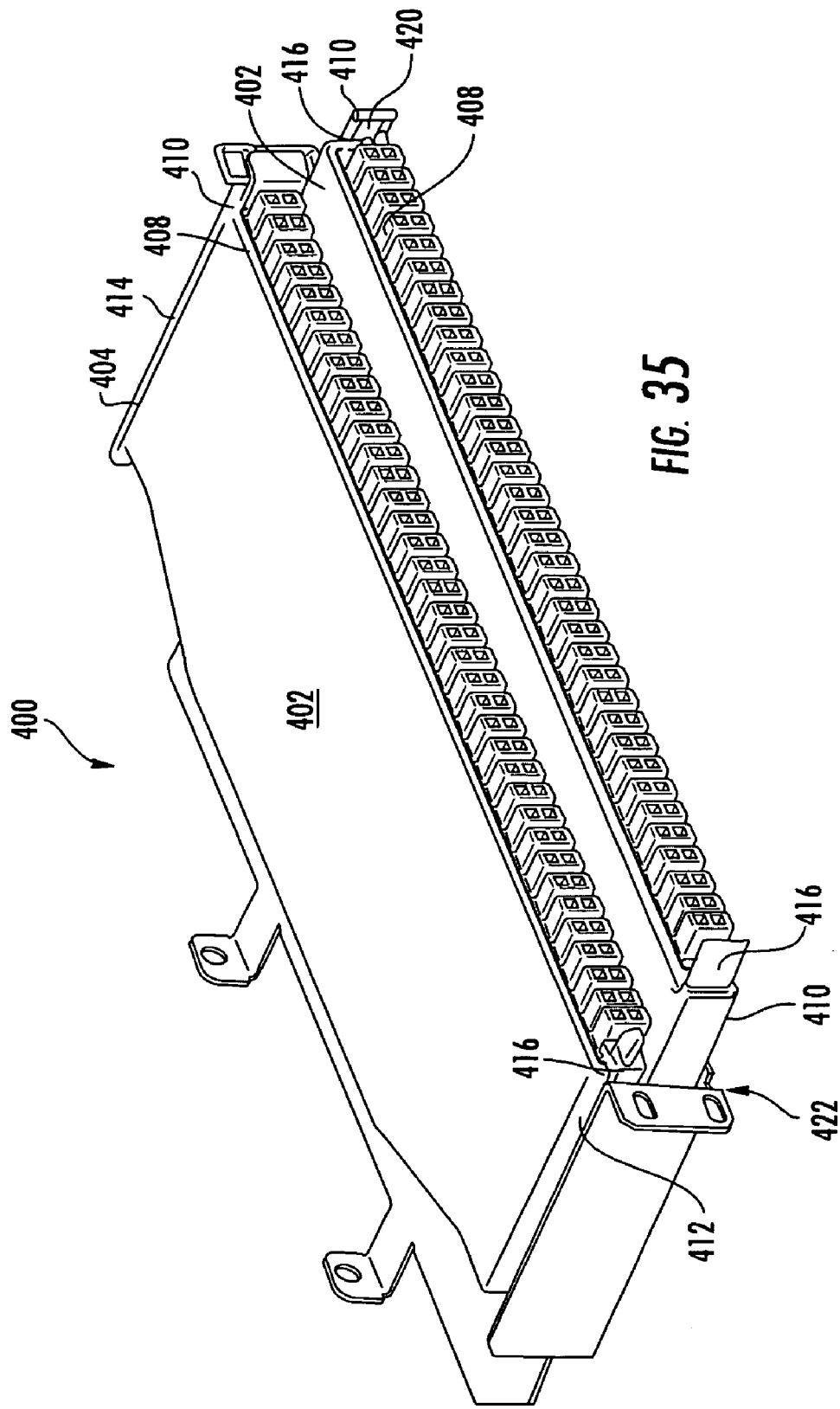
FIG. 35 is another front perspective view of another exemplary fiber optic equipment supporting rear-installable fiber optic modules.

FIGS. 34 and 35 illustrate yet another embodiment of fiber optic equipment 400. In this embodiment, a module guide system is provided to allow fiber optic modules 402 to translate independently of each other about a chassis 404 outward in the Z-axis direction. As illustrated herein, two (2) fiber optic modules 402 are provided. Each fiber optic module 402 contains a series of fiber optic adapters 406 disposed in a front end 408 of the fiber optic module 402. A module rail guide 410 is disposed in the fiber optic equipment 400 for each fiber optic module 402. As illustrated in FIGS. 34 and 35, two fiber optic modules 402 are provided that expand the entire width of the chassis 404. Thus, no intermediate module rail guides 410 are necessary or provided in the fiber optic equipment 400. Only two (2) module rail guides 410 are disposed on a first end 412 and a second end 414 of the chassis 404, although intermediate module rail guides can be provided if the fiber optic equipment 400 is designed to support multiple fiber optic modules in a single level or plane. Each fiber optic module 402 comprises a module rail 416 that is configured to be disposed within a channel 420 of the module rail guides 410. In this manner, the fiber optic modules 402 may be rear-installable and may be independently movable from each other along their dedicated module rail 416 so they can be pulled out towards a front end 422 of the fiber optic equipment 400 and chassis 404. This is illustrated in FIGS. 34 and 35 wherein the bottom fiber optic module 402 is pulled forward along its module rail 416 to provide access. After any access desired is completed, the bottom fiber optic module 402 can be pushed back in along its module rail 216 into the chassis 404 such that the front end 422 of the fiber optic module 402 will be disposed within the front end 408 of the chassis 404.

Figure 36:
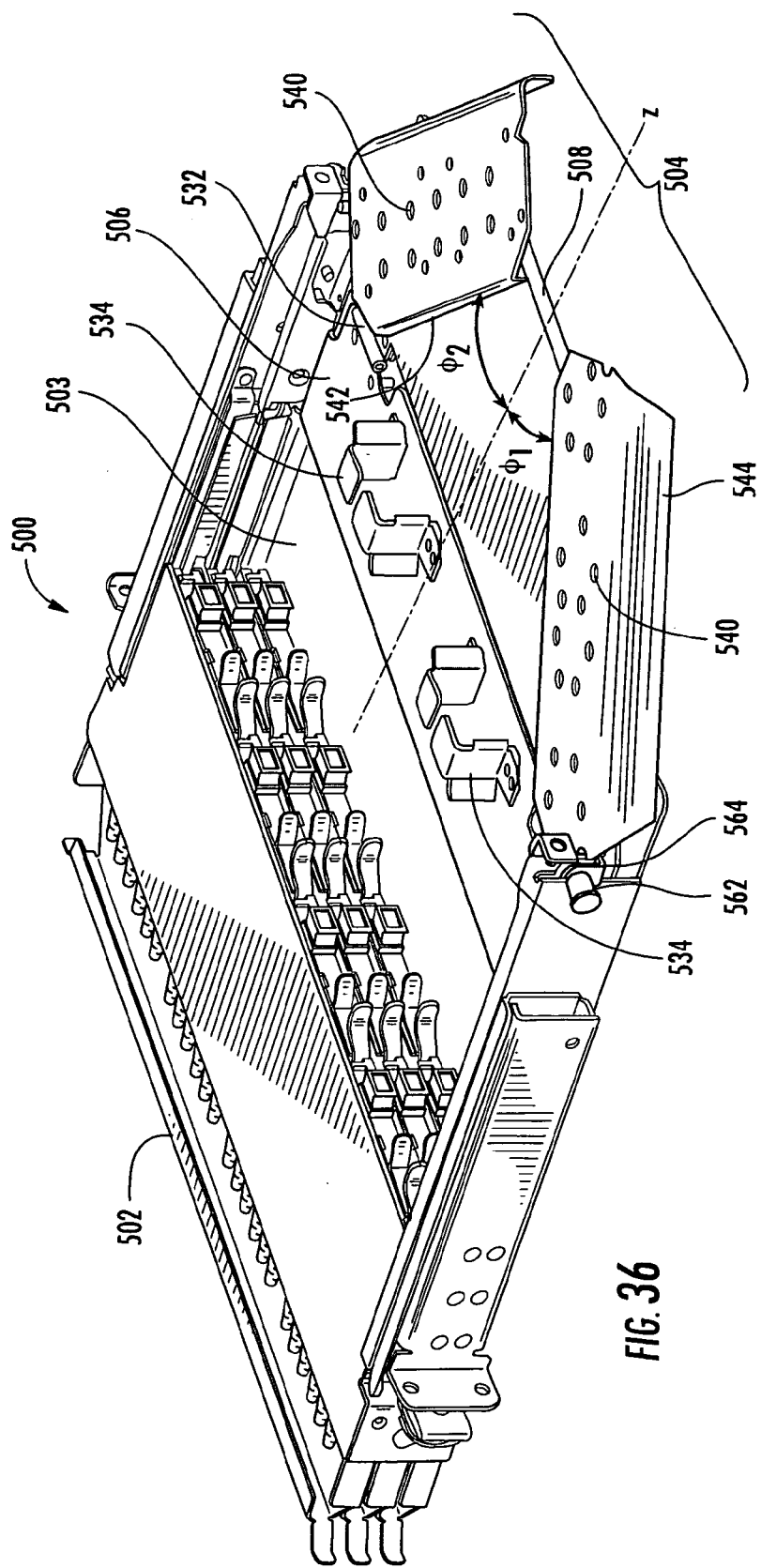
FIG. 36 is a rear perspective view of an exemplary embodiment of a fiber optic equipment tray and an extension in a retracted or closed position.
Figure 37:
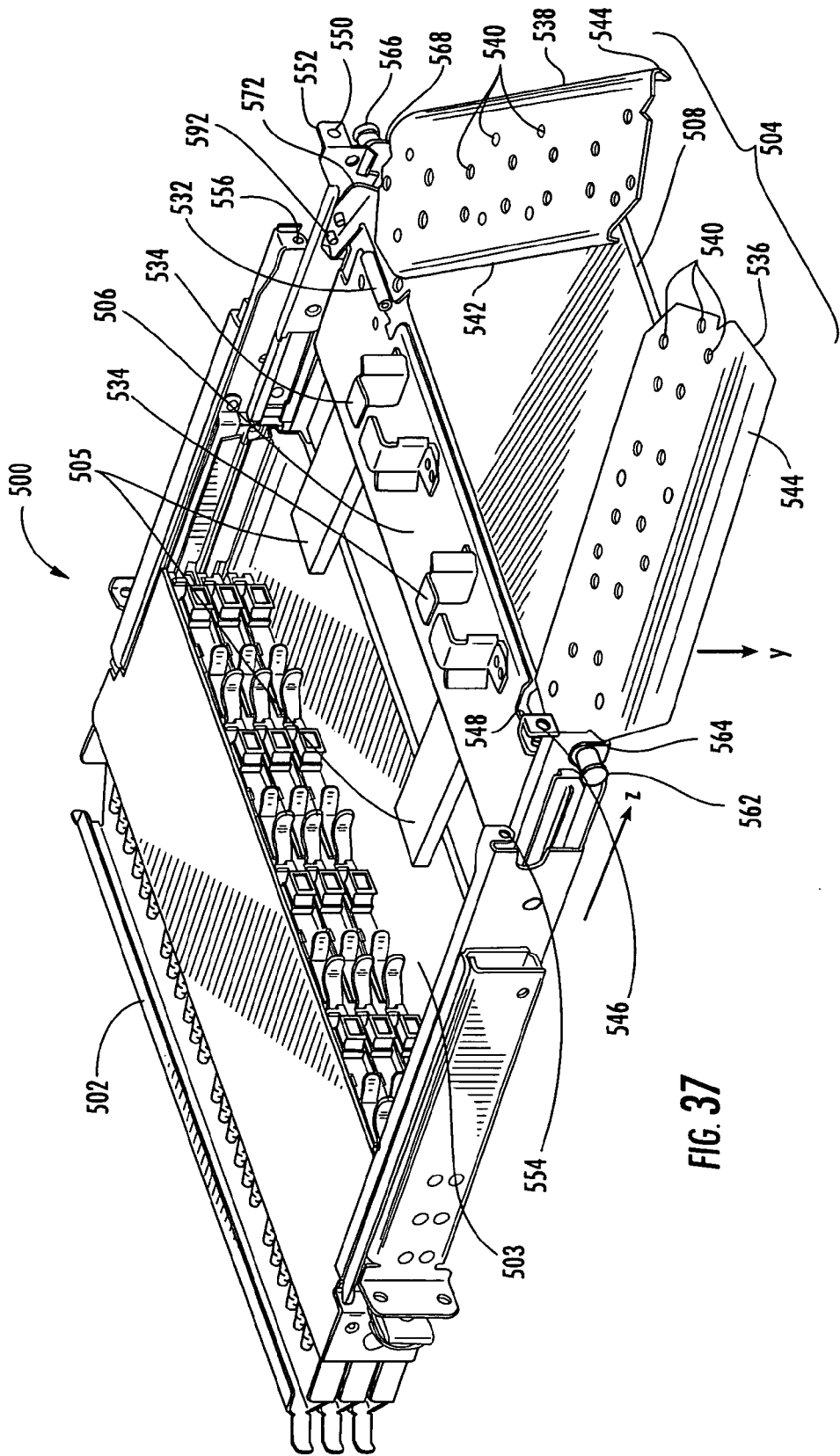
FIG. 37 is a rear perspective view of an exemplary embodiment of a fiber optic equipment tray and an extension in a extended or open position.
Figure 38:
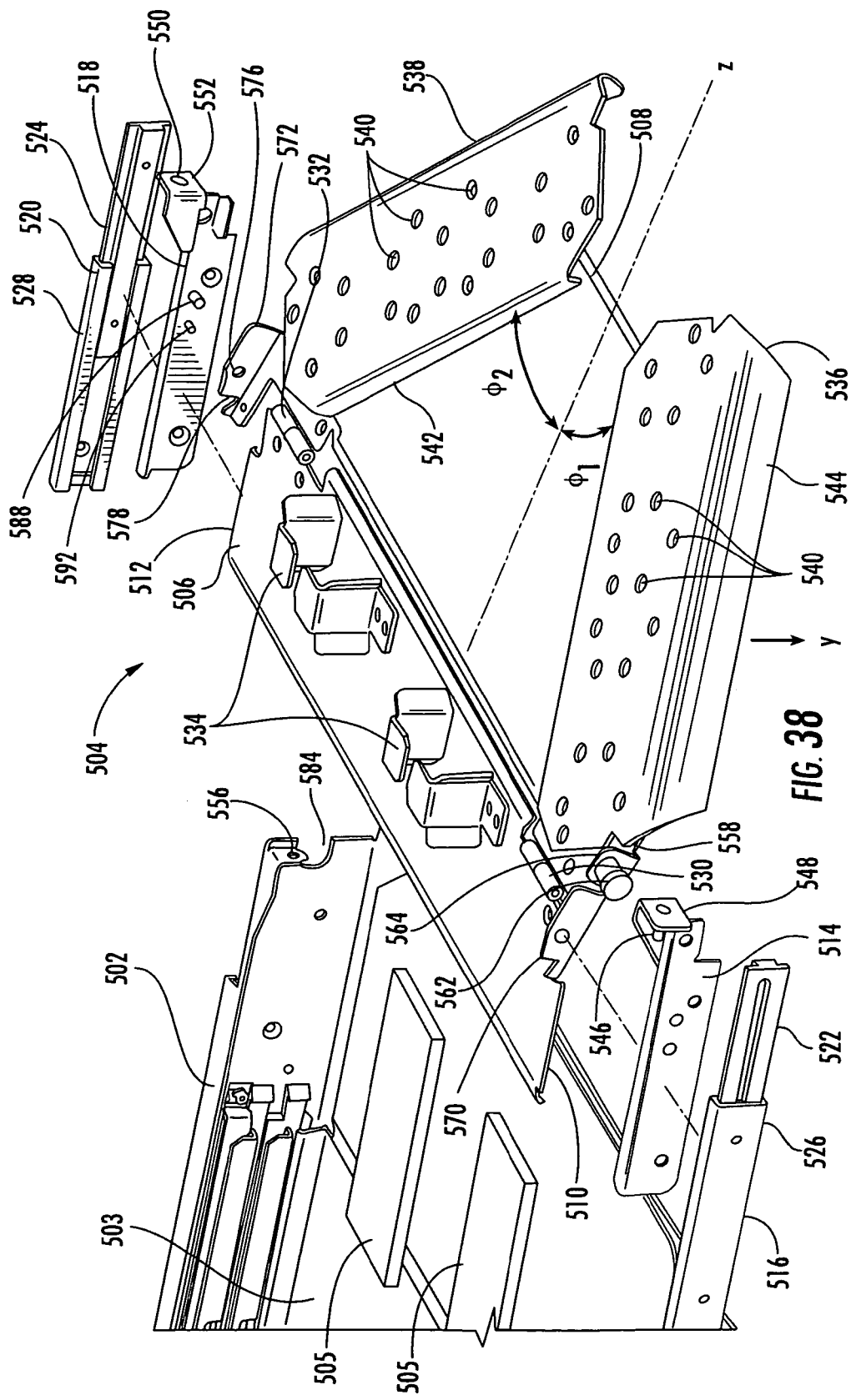
FIG. 38 is a rear perspective, exploded view of an exemplary embodiment of a fiber optic equipment tray and an extension.

FIGS. 36, 37 and 38 illustrate another exemplary embodiment of fiber optic equipment 500. In the embodiment shown in FIGS. 36, 37 and 38, the fiber optic equipment 500 has a fiber optic equipment tray 502 having a base 503 extending from a front to a rear. As used herein, the term "tray" should be understood to mean and include, without limitation, any structure, device, assembly, chassis or arrangement. Additionally, the fiber optic equipment 500 has an extension 504. The extension 504 is adapted to extend from and retract towards the fiber optic equipment tray 502 over the base 503 at the rear of the fiber optic equipment tray 502. FIG. 36 shows the extension 504 movably engaged with the fiber optic equipment tray 502 in the fully retracted or closed position. FIG. 37 shows the extension 504 movably engaged with the fiber optic equipment tray 502 in the fully extended or open position. The extension 504 may extend in the "Z" direction, indicated by the Z directional arrow in FIG. 37. FIG. 38 shows the extension 504 separated from fiber optic equipment tray 502 in exploded-view orientation. One or more stiffener supports 505 may be attached to the base 503 under the extension 504 to provide support for the extension 504.

In the embodiment shown in FIGS. 36, 37 and 38, the extension 504 has a shelf 506 and a cable management tray 508. The shelf 506 has a first shelf side 510 and a second shelf side 512. A first support 514 attaches to the first shelf side 510 and to a first extension rail 516. A second support 518 attaches to the second shelf side 512 and to a second extension rail 520. The first and second extension rails 516, 520 provide for the extension and retraction movement of the extension 504. First and second slidable inner rails 522, 524 fit into first and second stationary outer rails 526, 528, with ball bearings (not shown) positioned between the inner rails 522, 524 and the outer rails 526, 528 to allow for the slidable movement.

The cable management tray 508 may be hingedly attached to the shelf 506 via a hinge mechanism in the form of tray hinges 530, 532. The hinge mechanism allows the cable management tray 508 to rotate or pivot downwardly at an angle with respect to the plane of the shelf 506, and, thereby, not be in planar alignment with the fiber optic equipment tray 502. The cable management tray 508 may be pivoted downwardly when the extension 504 is retracted and/or partially or fully extended. Although the cable management tray 508 may pivot downwardly any amount, in one embodiment the cable management tray 508 may pivot downwardly at least about 20% or more from the plane of the shelf 506 and/or the fiber optic equipment tray 502. Although two tray hinges 530, 532 are shown, any number of hinges may be used. Additionally or alternatively, any mechanism or design that provides or allows for a pivoting or tilting action of the cable management tray 508 with respect to the shelf 506 may be employed. Such mechanism or design may include for example a hinge that is constructed of the same or different material as the shelf 506 and/or cable management tray 508. Additionally, the hinge mechanism may be formed as an integral portion of one or both of the shelf 506 and/or cable management tray 508.

Two fiber routing guides 534 are shown mounted to the shelf 506. Although two fiber routing guides 534 are shown, no fiber routing guides, one fiber routing guide, or any number of fiber routing guides may be used.

First and second furcation plug trays 536, 538 may be mounted to the cable management tray 508. The furcation plug trays 536, 538 are shown having mounting holes 540 to allow for the mounting of furcation plugs (not shown) into the furcation plug trays 536, 538. In the embodiment shown in FIGS. 36, 37 and 38, the furcation plug trays 536, 538 are shown mounted at angles $\Phi_1$, $\Phi_2$ with the longitudinal axis of the fiber optic equipment 500. For purposes of this embodiment, the longitudinal axis shall be referred to as the z axis of the fiber optic equipment 500. The angles $\Phi_1$, $\Phi_2$ may be the same or different angles. The furcation plug trays 536, 538 may have one or both of inner curved sides 542 and outer curved sides 544. The inner curved sides 542 may allow the furcation plug trays 536, 538 stand-off a certain distance above the cable management tray 508. The outer curved sides 544 allow for ease of placement of optical cables, such as trunk cables, to facilitate their insertion into the furcation plugs.

The first and second supports 514, 518 each has a locking mechanism mounted thereon. In the embodiment shown in FIGS. 36, 37, and 38, the locking mechanism is in the form of a first snap pem 546, which is shown positioned on first pem bracket 548 extending from the first support 514. A second snap pem 550 is shown positioned in a second pem bracket 552 extending from the second support 518. Other types of locking mechanisms may be used. The first snap pem 546 and second snap pem 550 releasably lock the extension 504 to the fiber optic equipment tray 502 by inserting into first locking hole 554 and second locking hole 556, respectively, as will be discussed in more detail below with respect to FIG. 40A.

Figure 39:
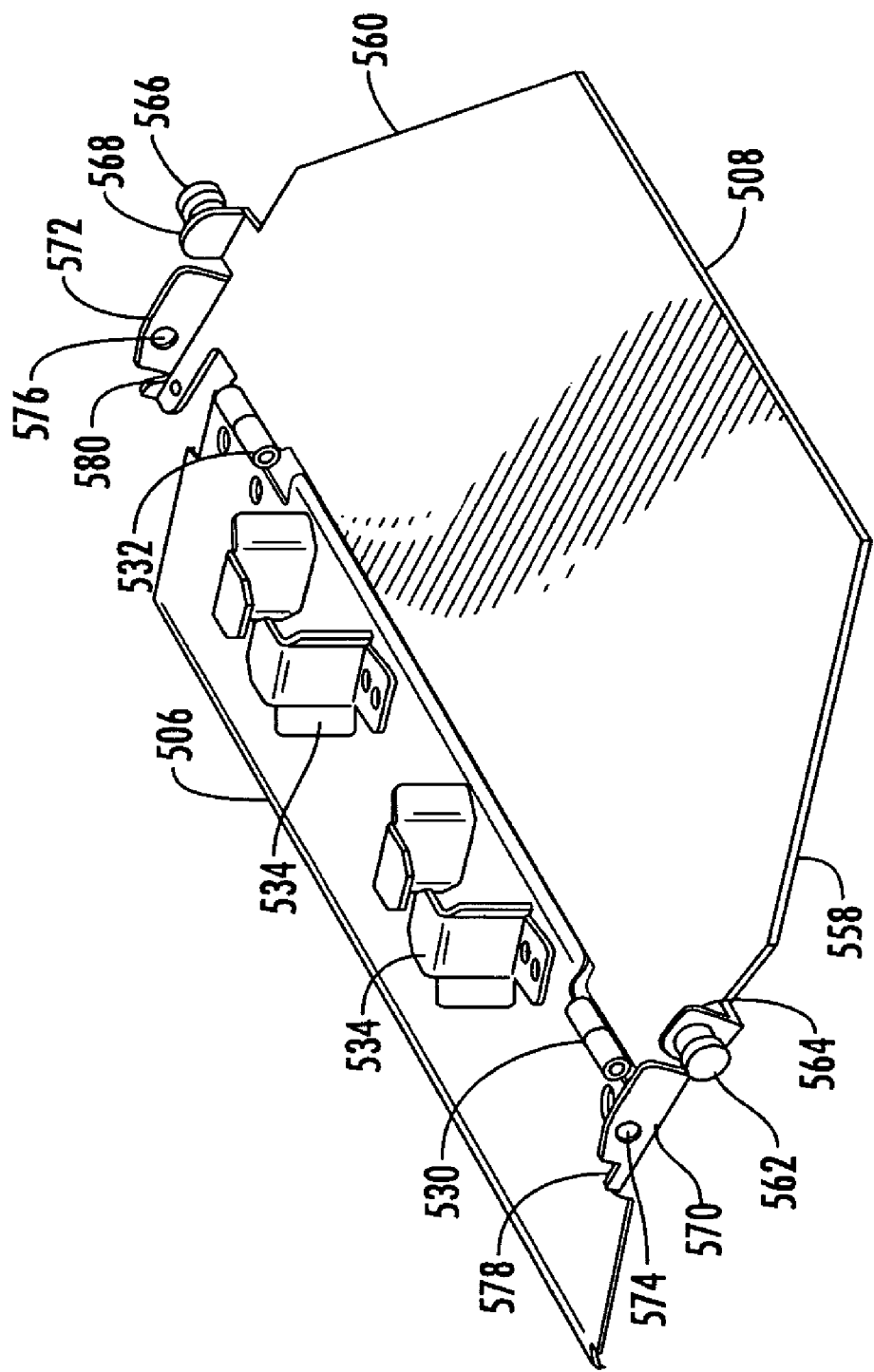
FIG. 39 is a partial, perspective view of a shelf and cable management tray of an extension without furcation plug trays.

Referring now to FIG. 39, the shelf 506 and the cable management tray 508 are shown without the furcation plug trays 536, 538. The cable management tray 508 has a first tray side 558 and a second tray side 560. A first plunger 562 mounts to the first tray side 558 via a first plunger bracket 564. A second plunger 566 mounts to the second tray side 560 via a second plunger bracket 568. The first and second plungers 562, 566 retain the cable management tray 508 in an upward position when the extension 504 is retracted as will be discussed in more detail below with respect to FIG. 40A. Also, in FIG. 39 are shown a pivot stop including a first pivot bracket 570 extending from first tray side 558 and second pivot bracket 572 extending from second tray side 560. The first and second pivot brackets 570 and 572, have respective first and second pivot holes 574 and 576, and first and second stop grooves 578, 580, as will be discussed in more detail below with respect to FIG. 40B.

Figure 40A:
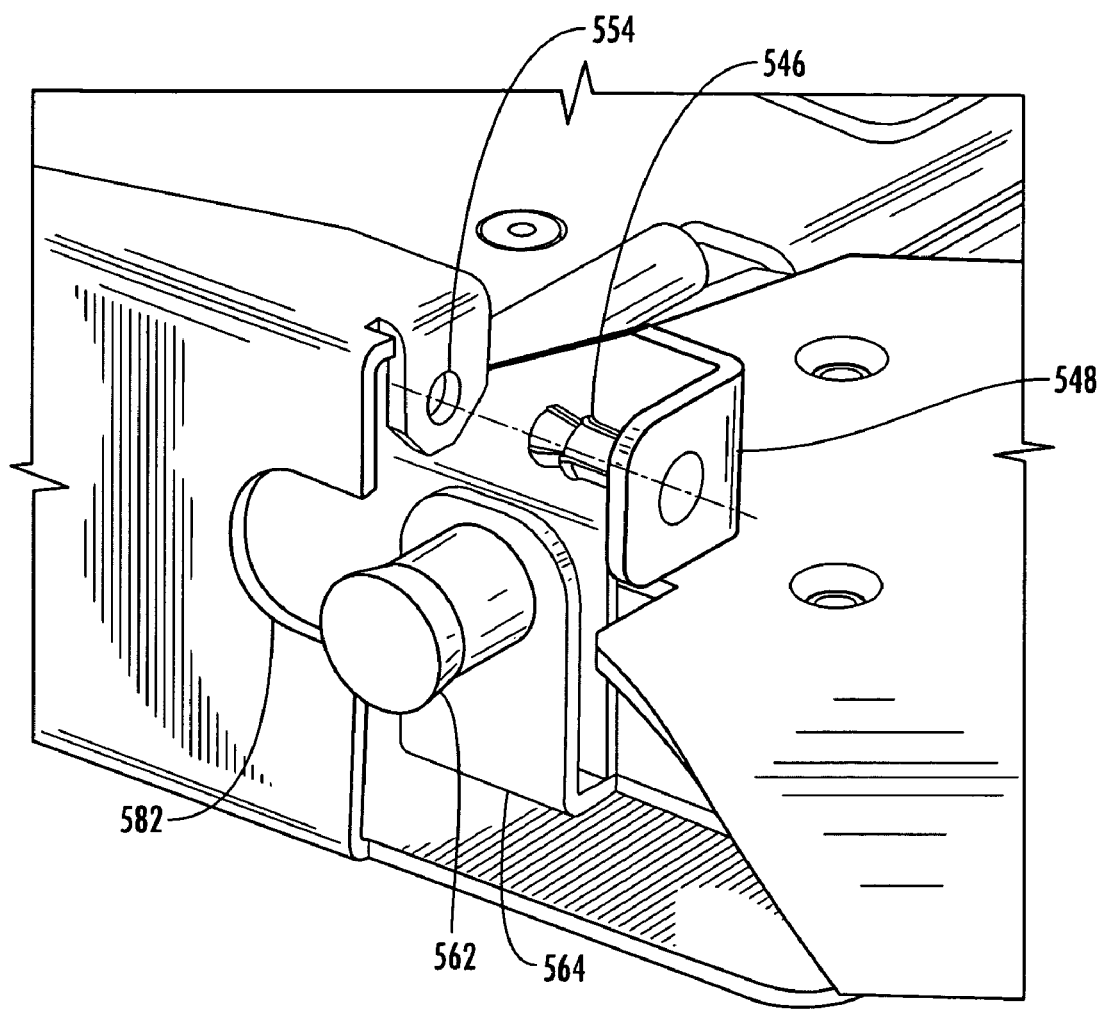
FIG. 40A is a perspective view of a snap pem and a plunger details of an extension.

A detail of the first snap pem 546 and first plunger 562 is shown in FIG. 40A. The first snap pem 546 is shown aligned with the first locking hole 554. When the extension 504 is fully retracted towards the fiber optic equipment tray 502, in the closed position, the first snap pem 546 inserts into the first locking hole 554. The extension 504 is then releasably locked to the fiber optic equipment tray 502. The extension 504 may subsequently be extended from the fiber optic equipment tray 502. Although not shown in FIG. 40A, the second snap pem 550 may insert into the second locking hole 556 in a similar fashion.

Also shown in FIG. 40A is a detail of the first plunger 562. The first plunger 562 aligns with first plunger slot 582. When the extension 504 is fully retracted towards the fiber optic equipment tray 502, the first plunger 562 slides into the first plunger slot 582. In this manner, the extension 504 may be restricted from pivoting while in the fully retracted position. Although not shown in FIG. 40A, the second plunger 566 may slide into the second plunger slot 584 in a similar fashion. In this manner, the cable management tray 508 may be placed and maintained in general planar alignment with the shelf 506.

Figure 40B:
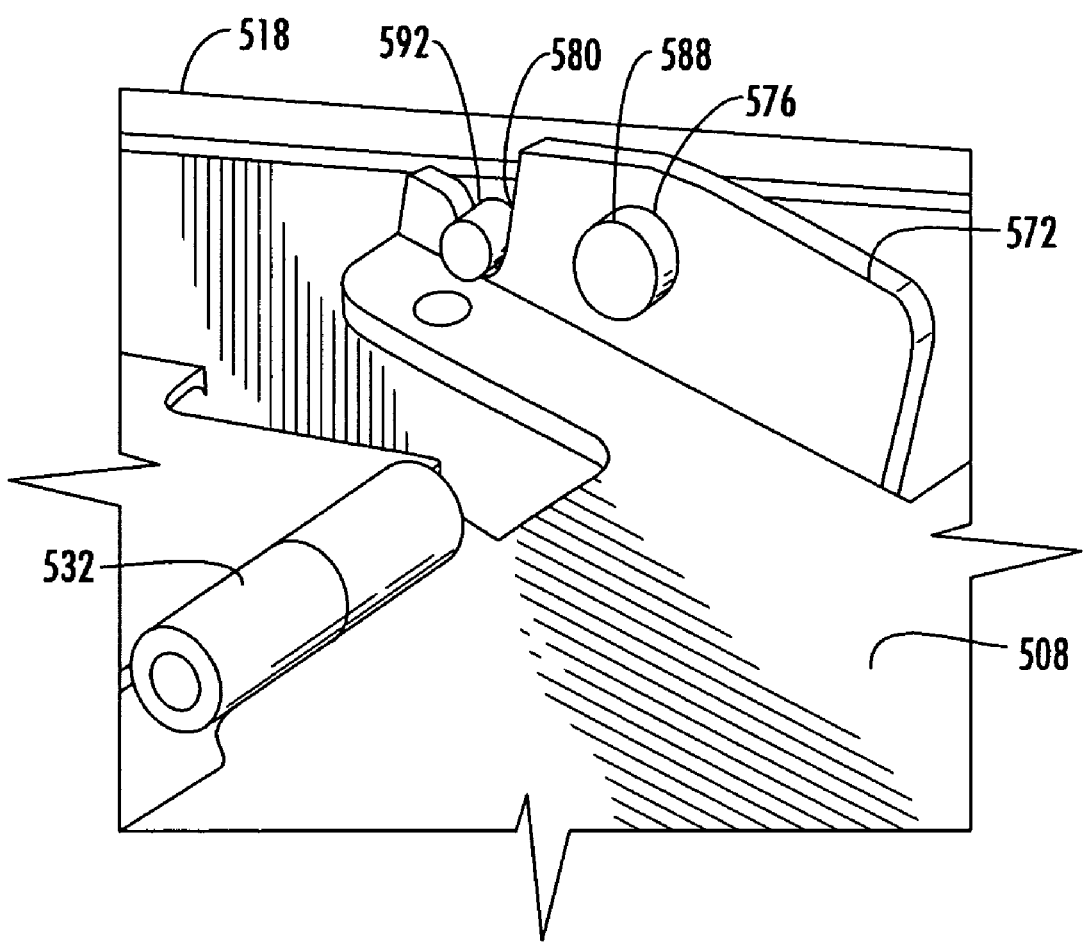
FIG. 40B is a perspective view of a pivot bracket detail of an extension.

Referring now to FIG. 40B, there is shown a detail of a pivot stop including the second pivot bracket 572, the second pivot hole 576, and second stop grooves 580. In the detail shown in FIG. 40B, the cable management tray 508 is in the pivoted position. The cable management tray 508 may pivot through the use of a second pivot pin 588. The second pivot pin 588 positions through the second pivot hole 576 allowing the cable management tray 508 to pivot until the second stop groove 580 contacts a second stop pin 592. Although not shown in FIG. 40B, the same design may apply to the first pivot bracket 570. A first pivot pin 586 may position through a first pivot hole 574 allowing the cable management tray 508 may pivot until a first stop groove 578 contacts a first stop pin 590.

Figure 41:
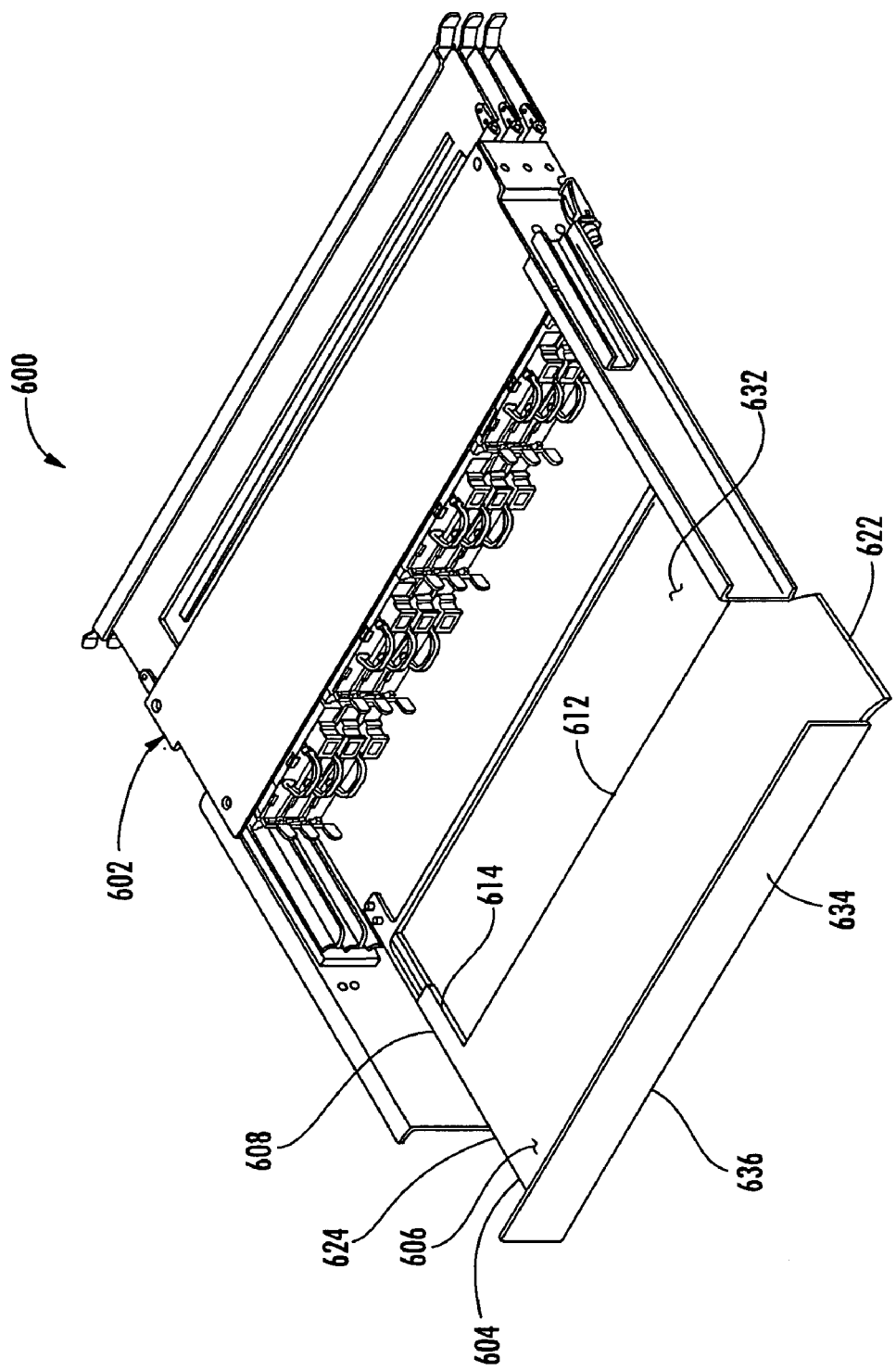
FIG. 41 is a rear, perspective view of a of an exemplary embodiment of a fiber optic equipment tray and an extension in a retracted or closed position.

FIGS. 41 and 42 illustrate another exemplary embodiment of fiber optic equipment 600. The fiber optic equipment tray 602 is shown having an extension 604 that extends from and retracts toward the rear of the fiber optic equipment tray 602. FIG. 41 illustrates the extension 604 retracted toward the fiber optic equipment tray 602, while FIG. 42 illustrates the extension 604 extended from the fiber optic equipment tray 602. The extension 604 comprises a shelf 606 with first and second channels 608, 610 extending from a front edge 612 of the shelf 606 at opposite ends. Each of the channels 608, 610 has an inside and outside guide walls. Thus, the first channel 608 has a first inside guide wall 614 and first outside guide wall 616, and second channel 610 has second inside guide wall 618 and second outside guide wall 620. The first and second inside guide walls 614, 618 may extend the length of the first and second channels 608, 610, respectively, from the front edge 612. The first and second outside guide walls 616, 620 may extend from a cable fall-off 622 the length of the shelf 606 along first and second sides 624, 626, respectively. The cable fall-off 622 provides a curved surface to allow for ease of placement of optical cables, such as trunk cables, onto the shelf 606. Additionally, the cable fall-off 622 may provide a stop when the extension is retracted toward the fiber optic equipment tray 602. Although only one cable fall-off 622 is shown located on second side 626, another cable fall-off 622 may be located on first side 624.

The first and second channels 608, 610 may position over respective first and second shelf rails 628, 630 mounted on a rear section 632 in positions to receive the first and second channels 608, 610. As such, the shelf 606 moves over the rear section 632. The first and second shelf rails 628, 630 are slightly smaller than the first and second channels 608, 610. This allows the first and second inside guide walls 614, 618 and the first and second outside guide walls 616, 620 to extend downwardly over the first and second shelf rails 628, 630, respectively. In this manner, the first and second channels 608, 610 may freely slide over and be guided by the first and second shelf rails 628, 630. A back wall 634 extends upwardly from a back edge 636 of the shelf 606.

The extension 604 may slidably move on the first and second channels 608, 610 to provide sufficient space for trunk, jumper, and other cabling to route to modules, adapters and any other components 636 located in the fiber optic equipment from other equipment. The back wall 634 is operable for retaining cabling on the shelf 606 and, thereby, controlling cable slack and deterring any slack from falling off or moving away from the fiber optic equipment tray 602. Accordingly, the extension 604 may be extended from or retracted toward the fiber optic equipment tray 602 any appropriate distance to accommodate the amount of cable slack. Additionally, the movement of the extension 604 may facilitate the easier installation and removal of the rear-installable fiber optic modules and/or other components 636.

FIG. 43 illustrates a detail cut-away section of a channel and a shelf rail. Although FIG. 43 illustrates only one channel and shelf rail, it is understood that the detail may apply to one or both of the first and second channels 608, 610 and first and second shelf rails 628, 630. In FIG. 43 a stop 638 is shown. The stop 638 keeps the first and second channels 608, 610 from sliding off of the first and second shelf rails 628, 630, respectively, and thereby separating the extension 604 from the fiber optic equipment tray 602. The stop 638 is formed by hooks 640 extending from each side of the first and second shelf rails 628, 630 at a distal end from the fiber optic equipment tray 602. The hook 640 each engage a lip 642 formed in the end of the first and second channels 608, 610 extending from the inside guide walls 614, 618 and outside guide wall 616, 620, respectively. Although a hook and limp design is illustrated in FIG. 43, it should be understood that any other type of design, structure or device may be used as a stop.

Figure 44:
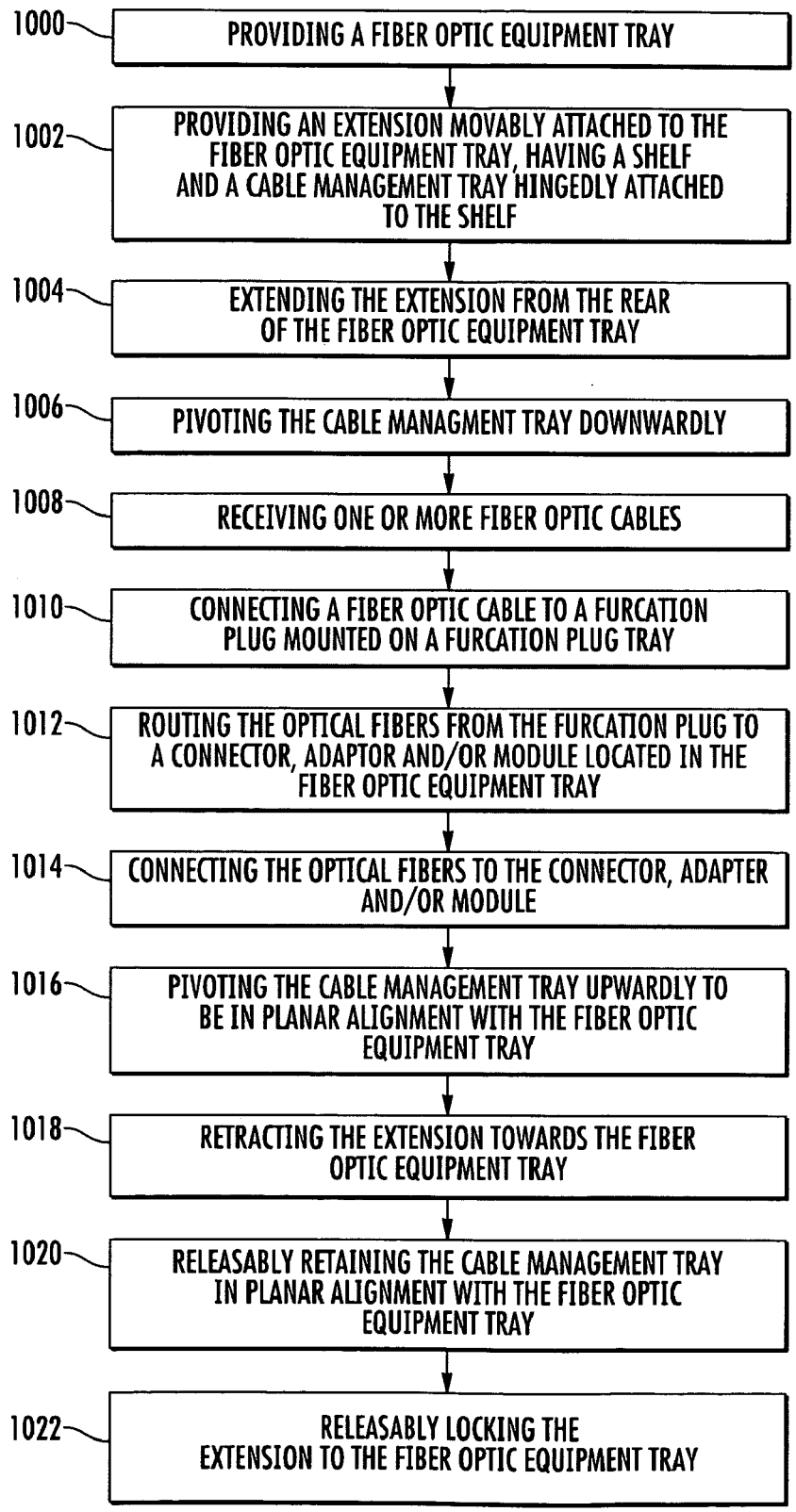
FIG. 44 is a flowchart illustrating a method of receiving fiber optic cables involving extending the extension, pivoting the cable management tray, and connecting the fiber optic cables and optical fibers therein, according to an exemplary embodiment.

The extension 504 may be adapted to receive one or more fiber optic cables, for example trunk cables. These fiber optic cables typically have multiple optical fibers. Referring now to FIG. 44 there is shown a method of receiving fiber optic cables involving extending the extension, pivoting the cable management tray, and connecting the fiber optic cables and optical fibers therein. A fiber optic equipment tray with an extension movably attached to the fiber optic equipment tray is provided. The extension has a shelf and a cable management hingedly attached to the shelf. (Steps 1000 and 1002) When a fiber optic cable is routed to the fiber optic equipment tray 502 the extension 504 may be extended from the fiber optic equipment tray 502. (Step 1004) The cable management tray 508 may then be pivoted downwardly to facilitate the reception and placement of the received fiber optic cable in the fiber optic equipment tray 502. (Step 1006) One or more fiber optic cables may be received. (Step 1008) By Pivoting the cable management tray 508 downwardly also provides for easier access and connection of the fiber optic cables to the furcation plugs which may be mounted on the first and/or second furcation plug trays 536, 538. (Step 1010) A technician performing the routing and connection of the fiber optic cables may have better hand access to the rear of the fiber optic equipment tray 502. Additionally, better hand access may be provided to the individual optical fibers outputted from a furcation plug. The individual optical fibers may then be routed over the shelf 506 to an adapter and/or module located in the fiber optic equipment tray 502, and connected to the connector, adapter or module. (Steps 1012 and 1014) Further, the routing of the individual optical fibers may be through the one or more fiber routing guides 534. In this way, with the extension 504 in the extended or open position and the cable management tray 508 pivoted downwardly, the fiber optic cables and the individual optical fibers may be received by and connected to components in the fiber optic equipment tray 502 in an organized and managed manner. Once the fiber optic cables are received and connected to the furcation plugs, and the individual optical fibers are routed from the furcation plugs and connected to connectors, adapters and/or modules, the cable management tray 508 may be pivoted upwardly to be in general planar alignment with the fiber optic equipment tray 502. (Step 1016) The extension 504 may then be retracted toward the fiber optic equipment tray 502 or moved to the closed position. (Step 1018) Once in the extension is in retracted position, the cable management tray 508 may be releasably retained in planar alignment with the shelf 506 and/or the fiber optic equipment tray 502 (Step 1020). Alternatively, the cable management tray 508 may be releasably retained in general planar alignment with the shelf 506 and/or the fiber optic equipment tray 502 prior to the extension being fully retracted. The extension may be releasably locked to the fiber optic equipment tray 502. (Step 1022)

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic modules, use of a fiber optic equipment tray, fiber optic connection type, number of fiber optic adapters, density, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus, comprising:
   a chassis;
   a fiber optic equipment tray moveably engaged with the chassis, the fiber optic equipment tray having a front and a rear; and an extension movably engaged with the fiber optic equipment tray, wherein the extension extends from and retracts toward the rear of the fiber optic equipment tray, and wherein the extension is adapted to receive fiber optic cables routed to the fiber optic equipment tray.

2. The fiber optic apparatus of claim 1, further comprising at least one extension rail attached to the fiber optic equipment tray, wherein the extension extends from and retracts toward the fiber optic equipment tray using the at least one extension rail.

3. The fiber optic apparatus of claim 2, wherein the at least one extension rail comprises a slidable rail attached to the extension, and wherein the extension slidably extends from and retracts toward the fiber optic equipment tray.

4. The fiber optic apparatus of claim 1, wherein the extension comprises a shelf positioned over a base at the rear of the fiber optic equipment tray, and wherein the shelf moves over the base when the extension extends from and retracts toward the fiber optic equipment tray.

5. The fiber optic apparatus of claim 1, wherein the extension comprises a cable management tray, and wherein the cable management tray includes a downward pivot.

6. The fiber optic apparatus of claim 5, further comprising at least one furcation plug tray attached to the cable management tray, wherein the at least one furcation plug tray is adapted for mounting one or more furcation plugs.

7. The fiber optic apparatus of claim 5, wherein the extension comprises a shelf, and wherein the cable management tray is hingedly attached to the shelf.

8. The fiber optic apparatus of claim 5, wherein the cable management tray is releasably retained in planar alignment with the fiber optic equipment tray when the extension is retracted, and wherein the cable management tray pivots downwardly from planar alignment with the fiber optic equipment tray when the extension is extended.

9. The fiber optic apparatus of claim 8, further comprising at least one plunger, wherein the at least one plunger positions into a slot to releasably retain the cable management tray in planar alignment with the fiber optic equipment tray when the extension is retracted.

10. The fiber optic apparatus of claim 5, further comprising a pivot stop, wherein the pivot stop limits the an amount of the downward pivot of the cable management tray.

11. The fiber optic apparatus of claim 10, wherein the pivot stop limits the amount of the downward pivot of the cable management tray to about 20 degrees.

12. The fiber optic apparatus of claim 10, wherein the pivot stop limits the amount of the downward pivot of the cable management tray to 20 degrees.

13. The fiber optic apparatus of claim 1, further comprising a locking mechanism, wherein the locking mechanism releasably locks the extension to the fiber optic equipment tray when the extension is retracted.

14. The fiber optic apparatus of claim 13, wherein the locking mechanism comprises at least one snap pem, wherein the at least one snap pem inserts into a locking hole to releasably lock the extension to the fiber optic equipment tray when the extension is retracted.

15. The fiber optic apparatus of claim 1, further comprising at least one fiber optic module mounted in the fiber optic equipment tray, wherein the extension is adapted to receive fiber optic cables routed to the at least one fiber optic module.

16. A fiber optic apparatus, comprising:
a chassis;
a fiber optic equipment tray moveably engaged with the chassis, the fiber optic equipment tray having a front and a rear;
at least one extension rail comprising a slidable inner rail and a stationary outer rail, wherein the at least one extension rail attaches to the fiber optic equipment tray via the stationary outer rail; and
an extension comprising at least one side support, wherein the extension attaches to the slidable inner rail of the least one extension rail at the at least one side support, wherein the extension slidably extends from and retracts toward the rear of the fiber optic equipment tray using the slidable inner rail, and wherein the extension is adapted to receive fiber optic cables routed to the fiber optic equipment tray.

17. The fiber optic apparatus of claim 16, wherein the extension comprises a shelf positioned over a base at the rear of the fiber optic equipment tray and a cable management tray hingedly attached to the shelf, and wherein the shelf moves over the base when the extension extends from and retracts toward the fiber optic equipment tray.

18. The fiber optic apparatus of claim 17, wherein the shelf and the cable management tray are in planar, alignment with the fiber optic equipment tray when the extension is retracted, and wherein the cable management tray is allowed to pivot downwardly when the extension is extended.

19. The fiber optic apparatus of claim 18, wherein the cable management tray is allowed to pivot downwardly at least about 20 degrees measured from the planar alignment of the fiber optic equipment tray.

20. The fiber optic apparatus of claim 18, wherein the cable management tray is allowed to pivot downwardly at least 20 degrees measured from the planar alignment of the fiber optic equipment tray.

21. The fiber optic apparatus of claim 16, further comprising at least one fiber optic module mounted in the fiber optic equipment tray, wherein the extension is adapted to receive fiber optic cables routed to the at least one fiber optic module.

22. A method of managing fiber optic cables received by a fiber optic apparatus, comprising:
providing a chassis;
providing a fiber optic equipment tray moveably engaged with the chassis, the fiber optic equipment tray having a front and a rear;
providing an extension movably attached to the fiber optic equipment tray, wherein the extension extends from and retracts toward the rear of the fiber optic equipment tray;
extending the extension to receive one or more fiber optic cable cables routed to the fiber optic equipment tray; and
receiving the one or more fiber optic cables by the extension.

23. The method of claim 22, wherein the extension comprises a hingedly attached cable management tray, and further comprising pivoting the cable management tray when the extension is extended.

24. The method of claim 23, wherein the cable management tray comprises at least one furcation plug tray adapted to mount at least one furcation plug.

25. The method of claim 24, further comprising connecting the one or more fiber optic cables to the at least one furcation plug mounted in the fiber optic equipment tray.

26. The method of claim 25, further comprising routing at least one optical fiber from the at least one furcation plug to at least one adapter mounted in the fiber optic equipment tray.

27. The method of claim 25, further comprising routing at least one optical fiber from the at least one furcation plug to at least one fiber optic module mounted in the fiber optic equipment tray.

28. The method of claim 23, further comprising:
pivoting the cable management tray upwardly to be in planar alignment with the fiber optic equipment tray; and
retracting the extension toward the fiber optic equipment tray.

29. The method of claim 28, further comprising:
releasably retaining the cable management tray in planar alignment with the fiber optic equipment tray; and
releasably locking the extension to the fiber optic equipment tray.

* * * * *